United States Patent [19]
Togino et al.

[11] Patent Number: 5,644,436
[45] Date of Patent: Jul. 1, 1997

[54] CONCENTRIC OPTICAL SYSTEM

[75] Inventors: Takayoshi Togino, Koganei; Kunie Nakagiri, Hachioji, both of Japan

[73] Assignee: Olympus Optical Co., Ltd., Tokyo, Japan

[21] Appl. No.: 405,711

[22] Filed: Mar. 17, 1995

[30] Foreign Application Priority Data

Mar. 18, 1994 [JP] Japan .................................. 6-048558

[51] Int. Cl.⁶ .................................................. G02B 17/00
[52] U.S. Cl. ........................... 359/731; 359/730; 359/858; 359/859
[58] Field of Search ................................... 359/643, 644, 359/645, 646, 647, 726, 727, 728, 729, 730, 731, 732, 839, 853, 858, 859

[56] References Cited

U.S. PATENT DOCUMENTS

| | | | |
|---|---|---|---|
| 27,356 | 5/1860 | La Russa | 359/839 |
| 2,785,604 | 3/1957 | Blaisse et al. | 359/731 |
| 3,700,310 | 10/1972 | Rayecs | 359/731 |
| 4,859,031 | 8/1989 | Berman et al. | 359/641 |
| 5,162,945 | 11/1992 | Matsuo et al. | 359/646 |

FOREIGN PATENT DOCUMENTS

| | | | |
|---|---|---|---|
| 73427 | 10/1953 | Netherlands | 359/731 |

*Primary Examiner*—Georgia Y. Epps
*Assistant Examiner*—Dawn-Marie Bey
*Attorney, Agent, or Firm*—Cushman, Darby & Cushman IP Group of Pillsbury Madison & Sutro LLP

[57] ABSTRACT

A concentric optical system usable as either an imaging optical system or an ocular optical system, which enables a clear image to be obtained at a field angle of up to about 90° and with a pupil diameter of up to about 10 millimeters with substantially no chromatic aberration. The concentric optical system includes a first optical component having a first semitransparent reflecting surface (2), and a second optical component having a second semitransparent reflecting surface (3). The first and second semitransparent reflecting surfaces (2 and 3) have respective centers of curvature disposed at approximately the same position (1). The first and second optical components are different in dispersion from each other. The first and second semitransparent reflecting surfaces (2 and 3) are arranged so that a bundle of light rays passing through the first semitransparent reflecting surface (2) is reflected by the second semitransparent reflecting surface (3), and the bundle of light rays reflected by the second semitransparent reflecting surface (3) is reflected by the first semitransparent reflecting surface (2) and then passes through the second semitransparent reflecting surface (3). The optical system satisfies the condition of $0.2 < v_1/v_2 < 1.00$, where $v_1$ is the Abbe's number of the first optical component, and $v_2$ is the Abbe's number of the second optical component.

18 Claims, 19 Drawing Sheets

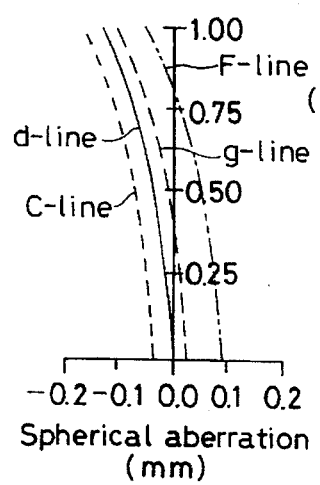
FIG. 12 (a)
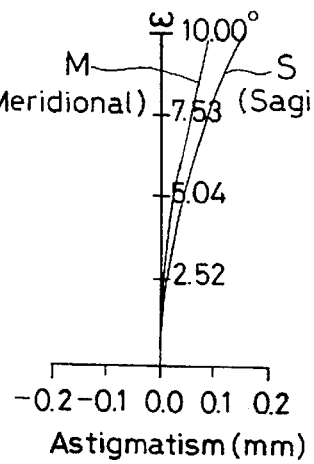
FIG. 12 (b)
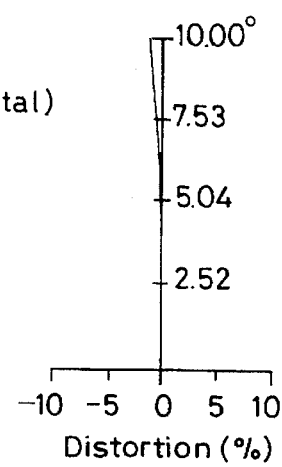
FIG. 12 (c)
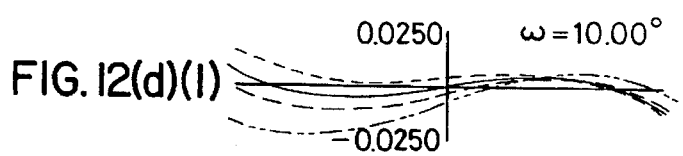
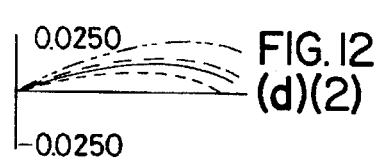
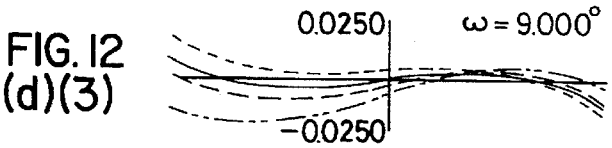
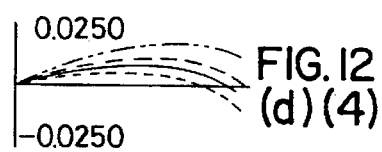
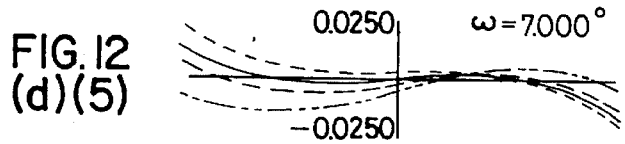
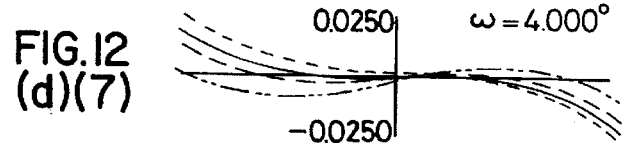
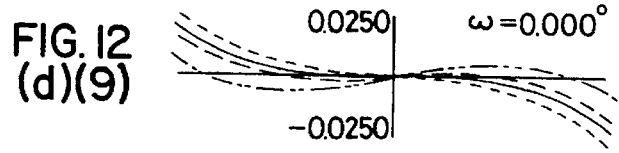
(Meridional direction)     (Sagittal direction)
Lateral aberration (mm)

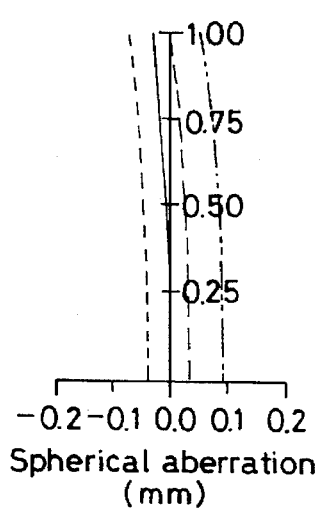
FIG. 13 (a)
Spherical aberration (mm)
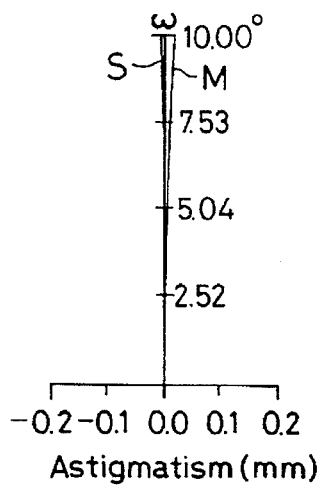
FIG. 13 (b)
Astigmatism (mm)
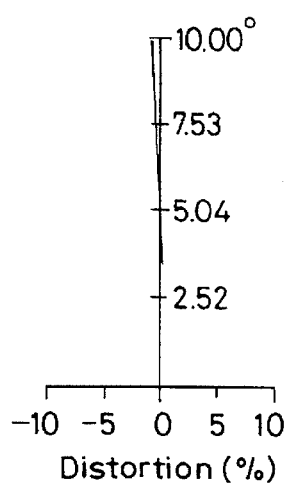
FIG. 13 (c)
Distortion (%)
FIG. 13 (d)(1) 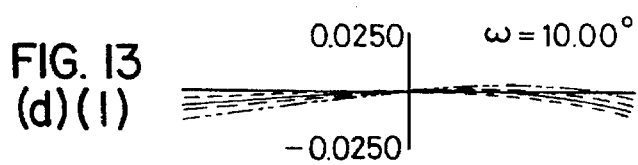 ω = 10.00° 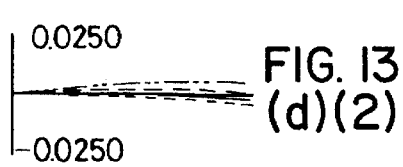 FIG. 13 (d)(2)
FIG. 13 (d)(3) 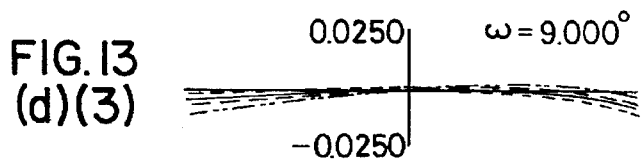 ω = 9.000° 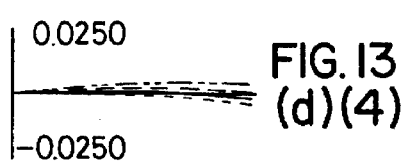 FIG. 13 (d)(4)
FIG. 13 (d)(5) 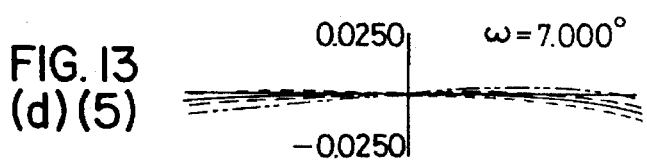 ω = 7.000° 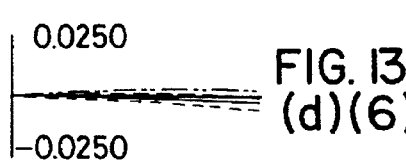 FIG. 13 (d)(6)
FIG. 13 (d)(7) 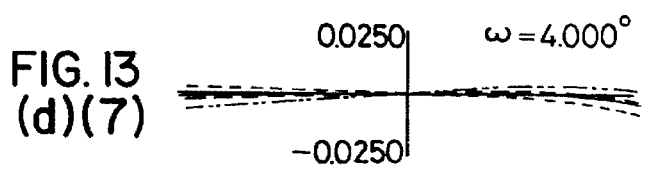 ω = 4.000° 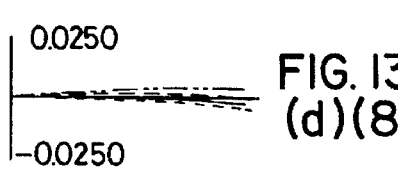 FIG. 13 (d)(8)
FIG. 13 (d)(9) 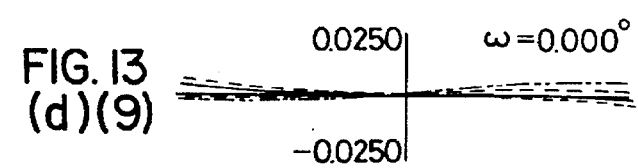 ω = 0.000° 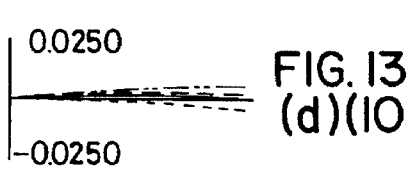 FIG. 13 (d)(10)
(Meridional direction)   (Sagittal direction)
Lateral aberration (mm)

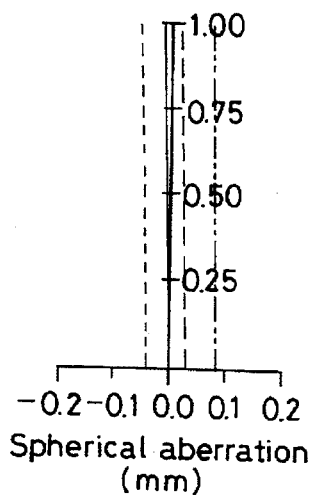
FIG. 14(a)
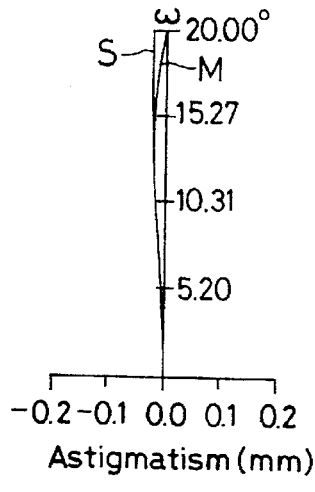
FIG. 14(b)
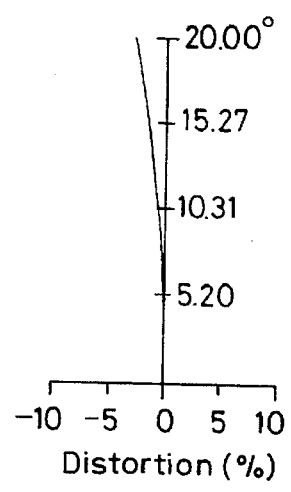
FIG. 14(c)
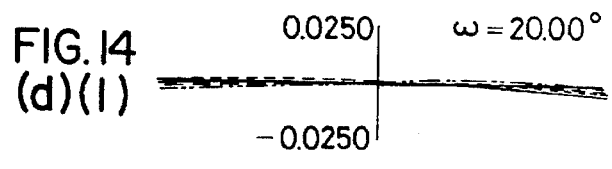
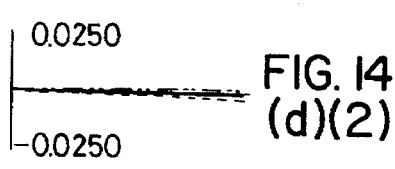
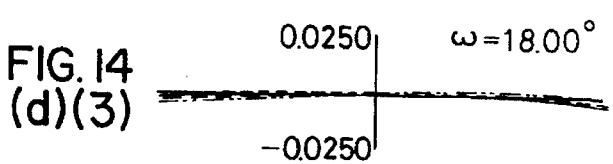
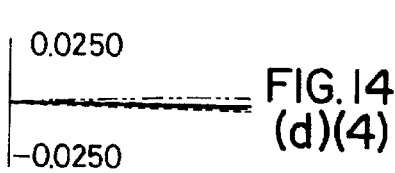
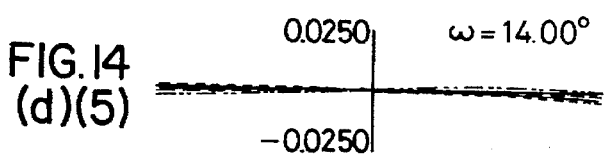
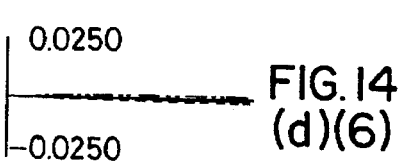
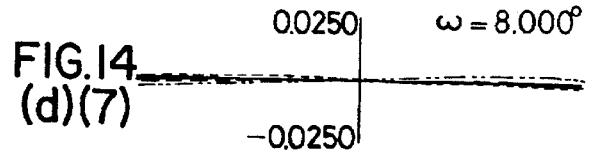
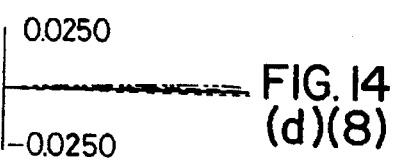
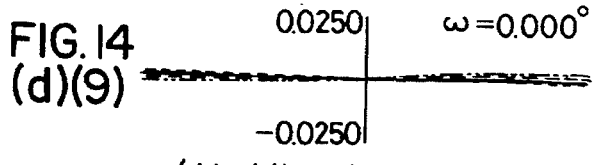
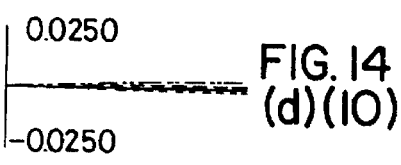
(Meridional direction) (Sagittal direction)
Lateral aberration (mm)

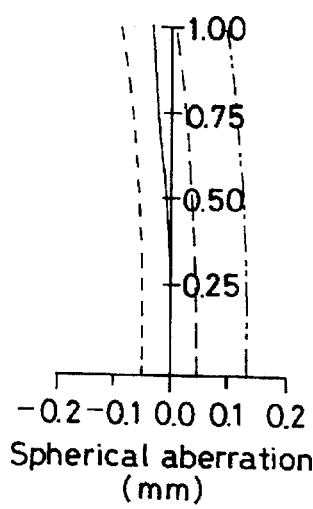
FIG. 15(a)
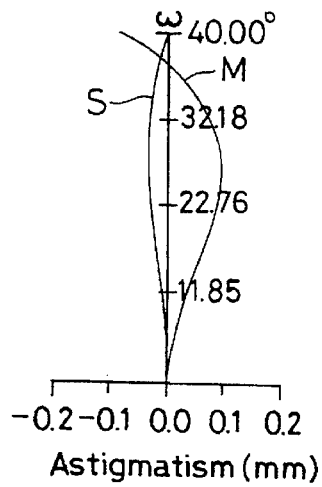
FIG. 15(b)
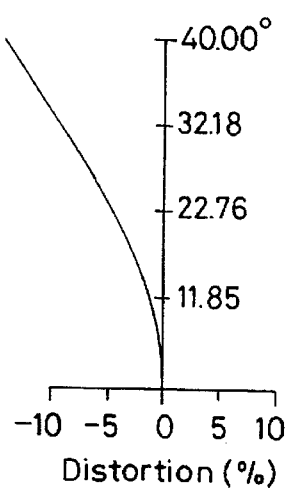
FIG. 15(c)
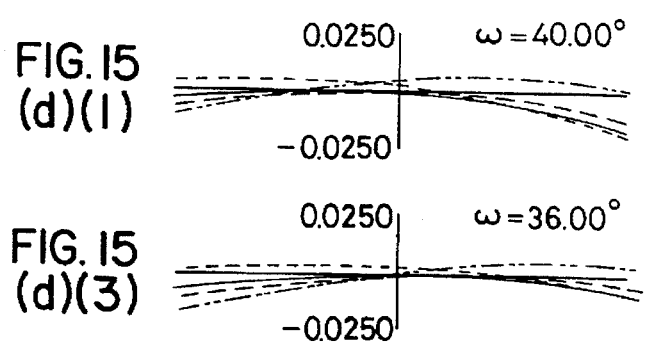
FIG. 15 (d)(1)    FIG. 15 (d)(2)
FIG. 15 (d)(3)    FIG. 15 (d)(4)
FIG. 15 (d)(5)    FIG. 15 (d)(6)
FIG. 15 (d)(7)    FIG. 15 (d)(8)
FIG. 15 (d)(9)    FIG. 15 (d)(10)
(Meridional direction)   (Sagittal direction)
Lateral aberration (mm)

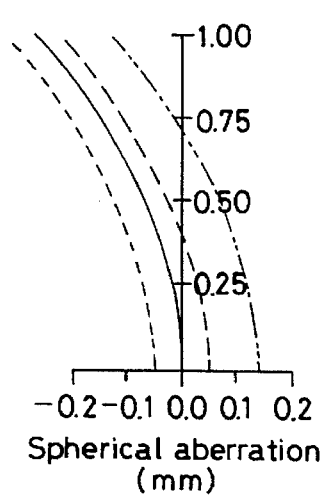
FIG. 16 (a) Spherical aberration (mm)
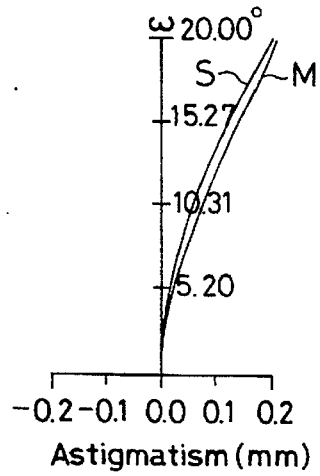
FIG. 16 (b) Astigmatism (mm)
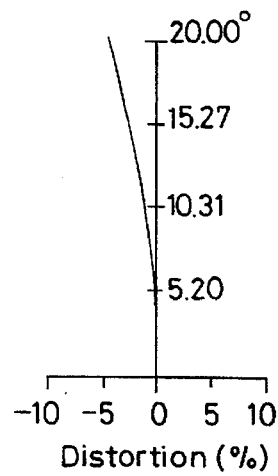
FIG. 16 (c) Distortion (%)
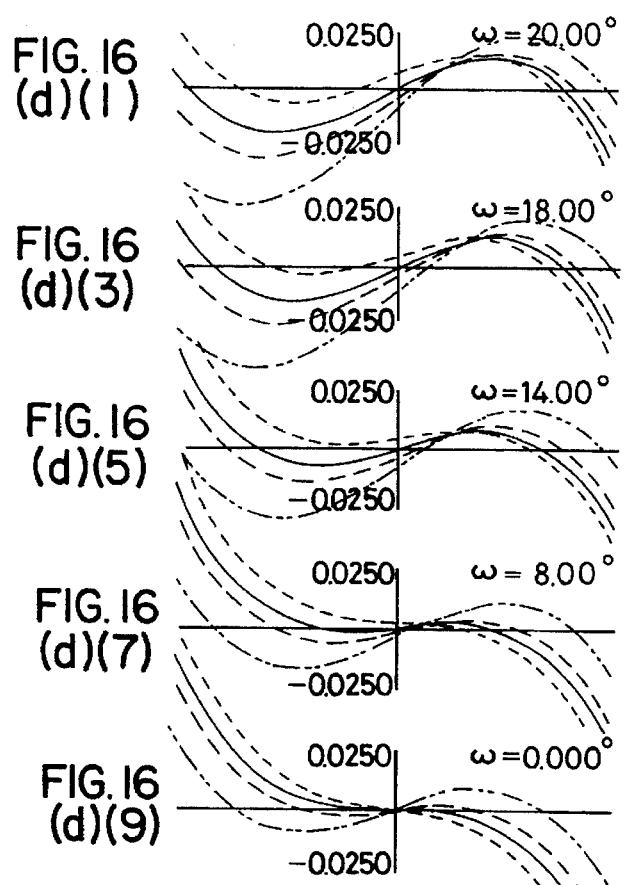
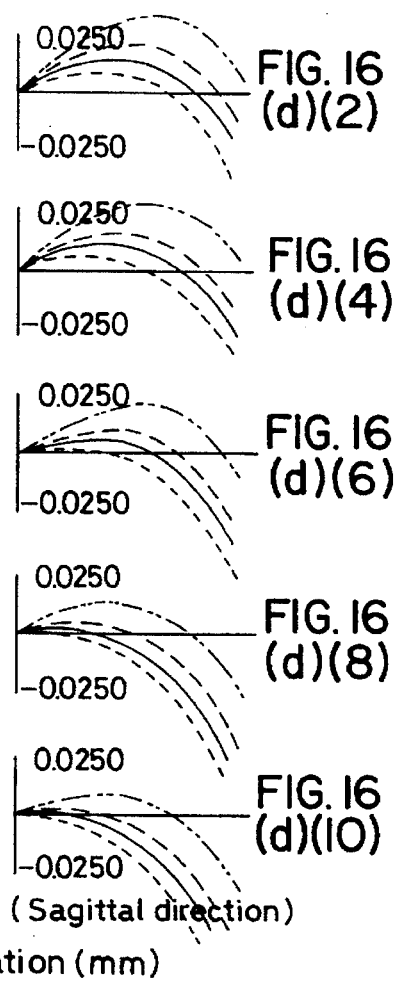
Lateral aberration (mm)

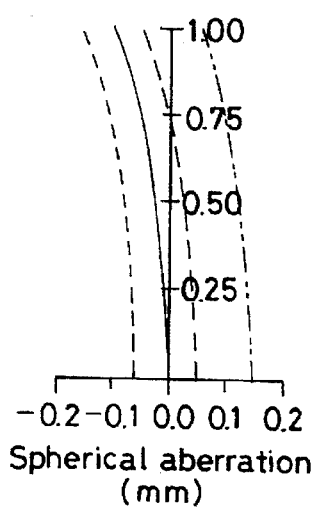
FIG. 17 (a)
Spherical aberration (mm)
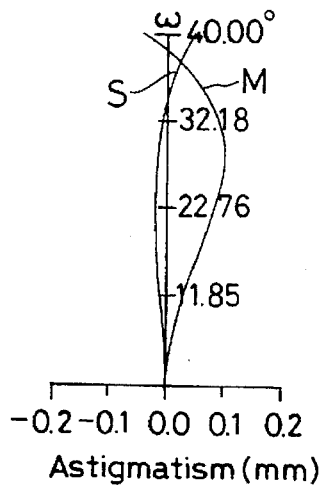
FIG. 17 (b)
Astigmatism (mm)
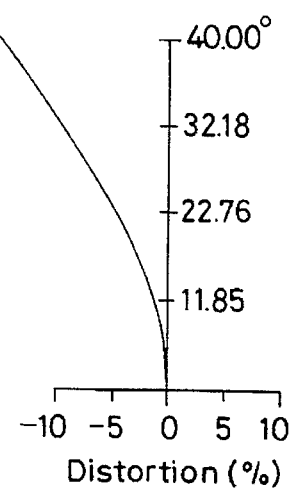
FIG. 17 (c)
Distortion (%)
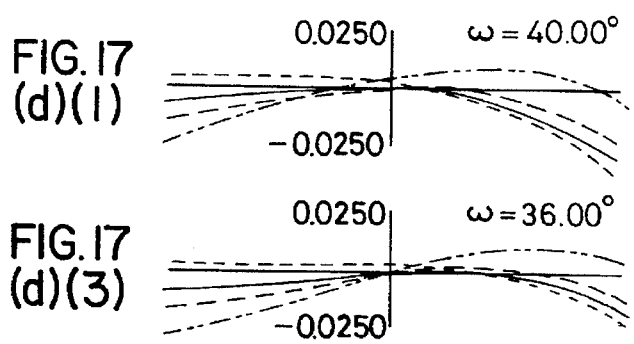
FIG. 17 (d)(1)
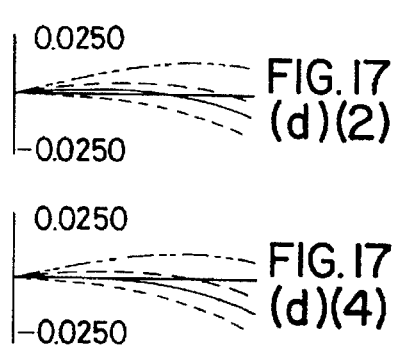
FIG. 17 (d)(2)
FIG. 17 (d)(3)
FIG. 17 (d)(4)
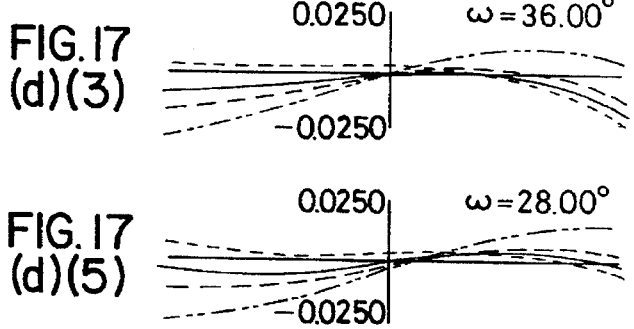
FIG. 17 (d)(5)
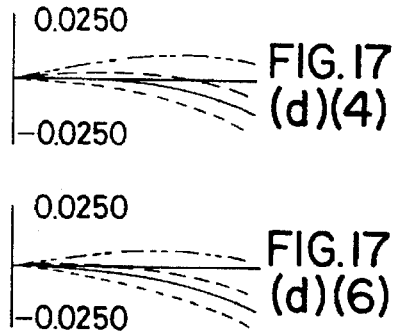
FIG. 17 (d)(6)
FIG. 17 (d)(7)
FIG. 17 (d)(8)
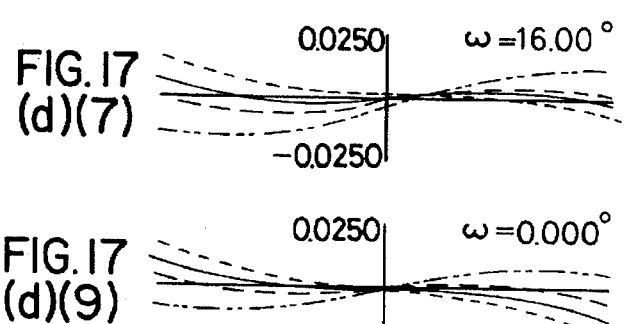
FIG. 17 (d)(9)
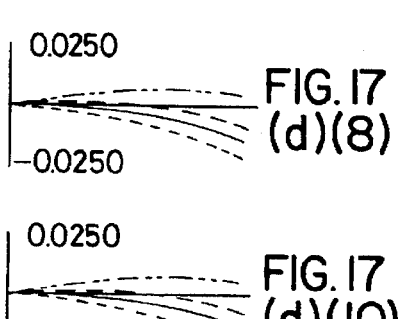
FIG. 17 (d)(10)
(Meridional direction)    (Sagittal direction)
Lateral aberration (mm)

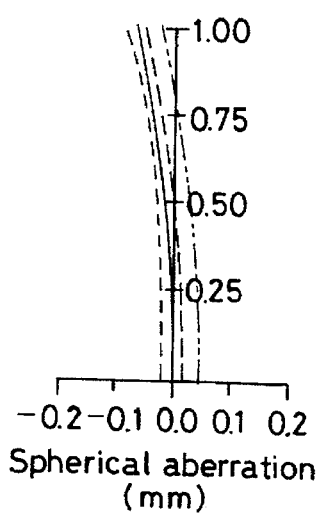
FIG. 18 (a)
Spherical aberration (mm)
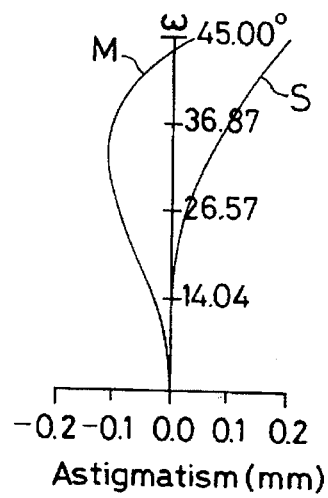
FIG. 18 (b)
Astigmatism (mm)
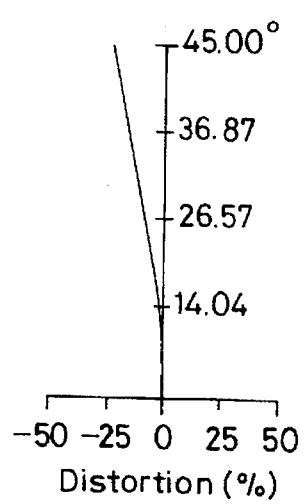
FIG. 18 (c)
Distortion (%)
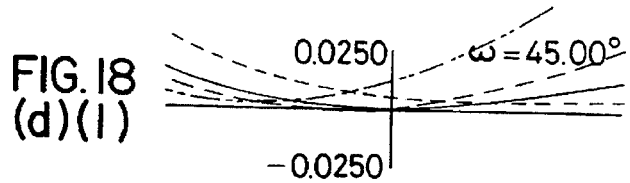
FIG. 18 (d)(1)
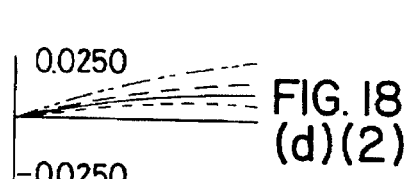
FIG. 18 (d)(2)
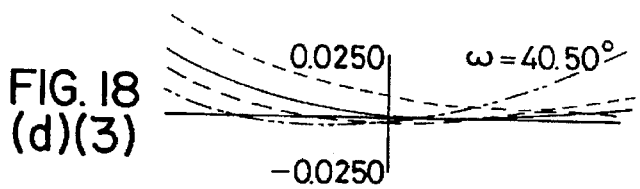
FIG. 18 (d)(3)
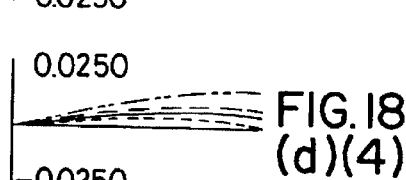
FIG. 18 (d)(4)
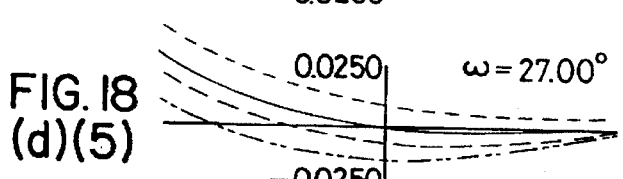
FIG. 18 (d)(5)
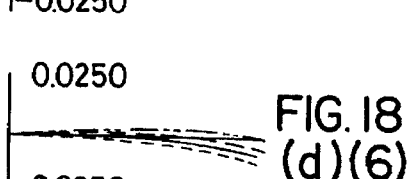
FIG. 18 (d)(6)
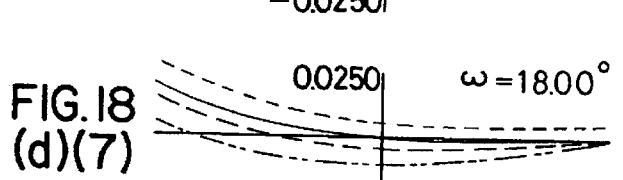
FIG. 18 (d)(7)
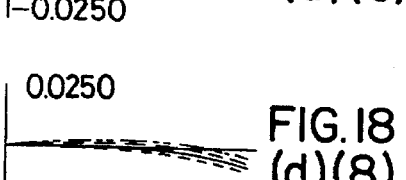
FIG. 18 (d)(8)
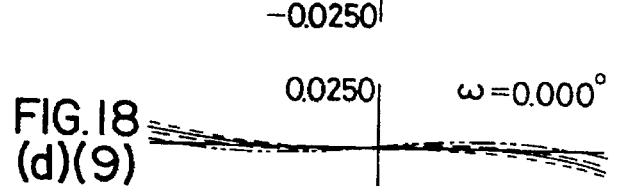
FIG. 18 (d)(9)
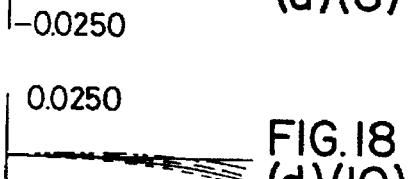
FIG. 18 (d)(10)
(Meridional direction)   (Sagittal direction)
Lateral aberration (mm)

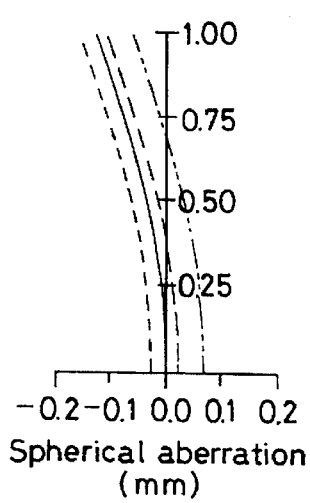
FIG. 19 (a) Spherical aberration (mm)
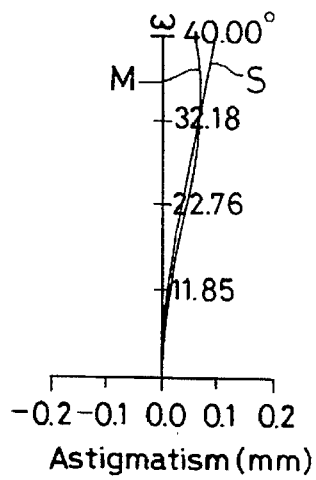
FIG. 19 (b) Astigmatism (mm)
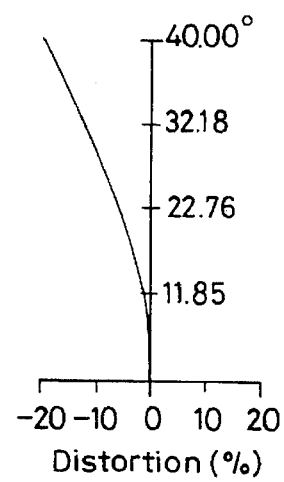
FIG. 19 (c) Distortion (%)
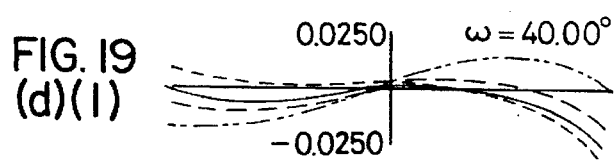
FIG. 19 (d)(1) ω = 40.00°
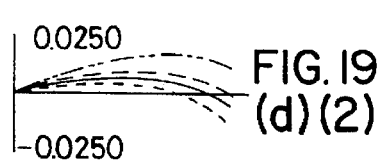
FIG. 19 (d)(2)
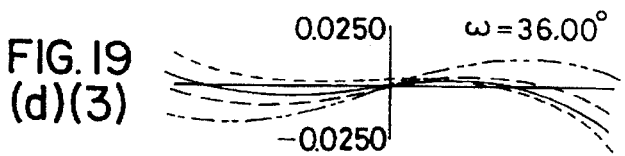
FIG. 19 (d)(3) ω = 36.00°
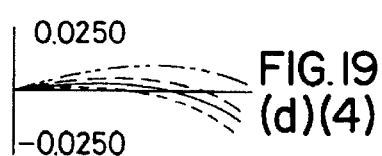
FIG. 19 (d)(4)
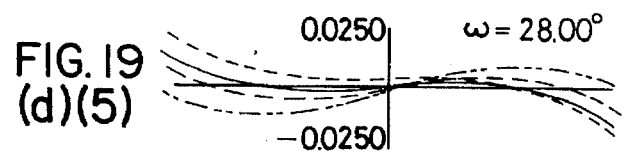
FIG. 19 (d)(5) ω = 28.00°
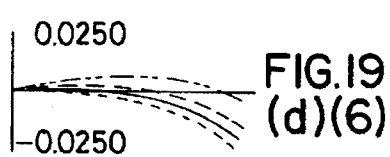
FIG. 19 (d)(6)
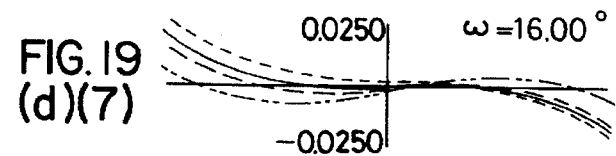
FIG. 19 (d)(7) ω = 16.00°
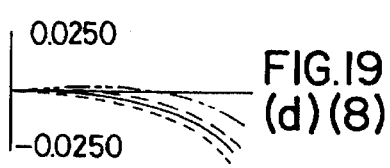
FIG. 19 (d)(8)
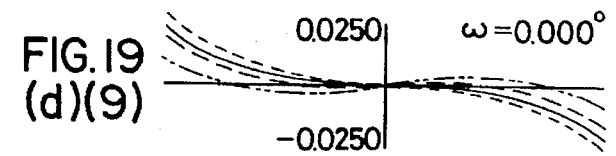
FIG. 19 (d)(9) ω = 0.000°
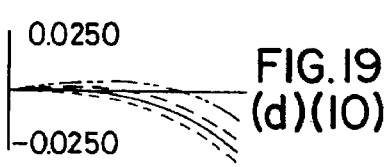
FIG. 19 (d)(10)
(Meridional direction)   (Sagittal direction)
Lateral aberration (mm)

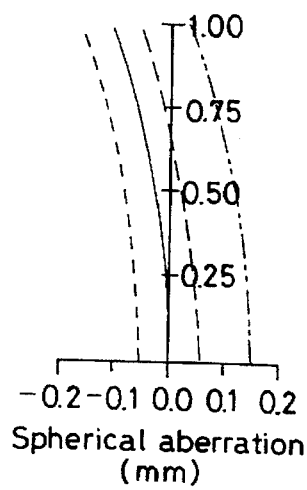
FIG. 20(a)
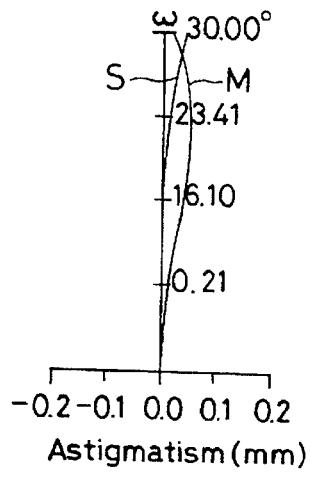
FIG. 20(b)
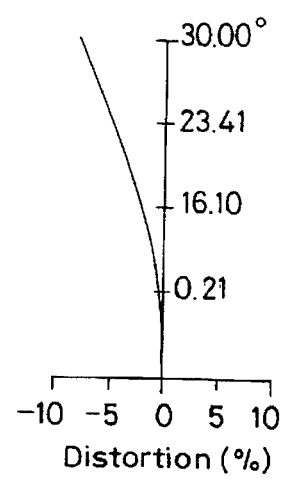
FIG. 20(c)
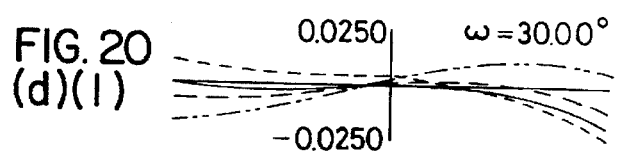
FIG. 20(d)(1)
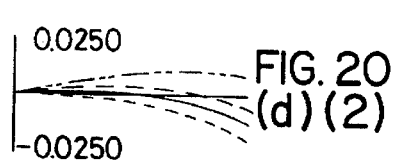
FIG. 20(d)(2)
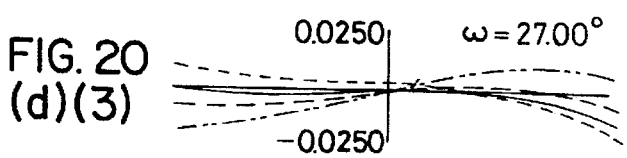
FIG. 20(d)(3)
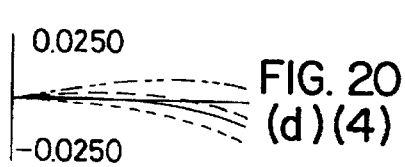
FIG. 20(d)(4)
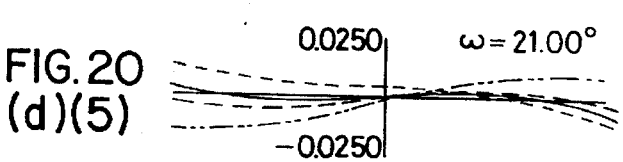
FIG. 20(d)(5)
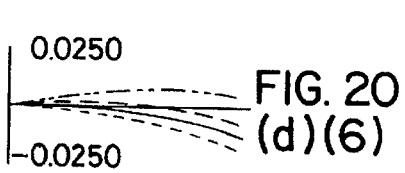
FIG. 20(d)(6)
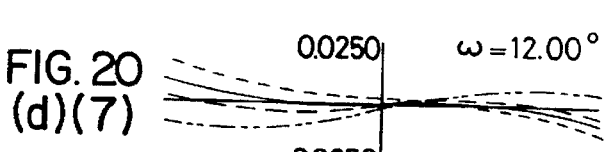
FIG. 20(d)(7)
FIG. 20(d)(8)
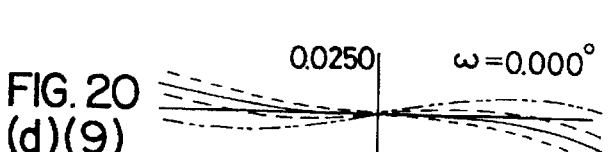
FIG. 20(d)(9)
FIG. 20(d)(10)
(Meridional direction)   (Sagittal direction)
Lateral aberration (mm)

CONCENTRIC OPTICAL SYSTEM

BACKGROUND OF THE INVENTION

1. Field of the Invention

The present invention relates to a concentric optical system which is usable as either an ocular optical system or an imaging optical system. More particularly, the present invention relates to a concentric optical system which provides a high resolution, a wide field angle and a large pupil diameter with minimal chromatic aberration.

2. Background of Related Art

A Schmidt system, which is well known as an objective for astronomical telescopes, is generally arranged such that an aspherical lens which is close to a plane-parallel plate is placed at the spherical center of a concave mirror to correct spherical aberration, and a diaphragm is disposed at the spherical center to correct coma and astigmatism.

Concentric optical systems, which are represented by the above Schmidt system, are free from coma and astigmatism by virtue of the diaphragm disposed in the vicinity of the center of curvature of the concave mirror. However, since the curvature of field cannot be corrected, a large field curvature occurs.

U.S. Reissued Pat. No. 27,356 discloses an ocular optical system which uses a semitransparent concave mirror and a semitransparent plane mirror to project an object surface at a distance, and which adopts an arrangement wherein the field curvature produced by the semitransparent concave mirror is corrected by curving the object surface. In U.S. Reissued Pat. No. 27,356, however, the semitransparent concave mirror and the semitransparent plane mirror are each formed from a single independent constituent element. Therefore, when the field angle is widened, off-axis aberrations such as astigmatism, coma, etc. are likely to occur. In addition, the radius of curvature of the semitransparent concave mirror reduces, which is unfavorable from the manufacturing point of view in actual practice.

There has also been a known arrangement in which light rays are reflected by a forward mirror to once turn back the optical axis, and the reflected rays are reflected again by another mirror. The arrangement is known as a reflecting telephoto objective. FIG. 24 is a sectional view showing U.S. Pat. No. 3,700,310 as one example of the reflecting telephoto objective. Referring to the figure, rays successively pass through lenses A, B, C and D and are reflected by a mirror 12. The reflected rays pass through the lenses D and C and are reflected by a mirror 13. Then, the reflected rays successively pass through the lenses C, F, G, H and I to form an image.

In the conventional reflecting telephoto objective, however, the mirrors 12 and 13 are totally reflecting mirrors. Therefore, it is necessary in order to prevent a bundle of rays entering through the foremost surface $R_1$ from being cut by the mirror 12 or 13 to increase the size of the mirrors 12 and 13 or to provide the pupil position in the range of from the foremost surface $R_1$ to the rearmost surface $R_6$. Accordingly, the pupil of the conventional reflecting telephoto objective is provided between the foremost and rearmost surfaces of the entire lens system to prevent the image from darkening without an increase in size of the entire lens system. In the above-described U.S. Pat. No. 3,700,310, the pupil is provided on the surface $R_6$.

However, since it is necessary to take the turn-back optical paths into consideration when installing the mirrors, the degree of freedom is disadvantageously low, and the aberration correcting capability is also deteriorated. In addition, different lenses are used for each turn-back optical path, such as the lenses A and B and the central lens E, and the lens D and the lenses F to I, which are disposed in the center thereof, in U.S. Pat. No. 3,700,310. Accordingly, the arrangement is complicated, and thus the conventional optical system involves problems such as reduction in productivity, rise in cost, etc.

SUMMARY OF THE INVENTION

In view of the above-described problems of the related art, an object of the present invention is to provide a concentric optical system usable as either an imaging optical system or an ocular optical system, which enables a clear image to be obtained at a field angle of up to about 90° and with a pupil diameter of up to about 10 millimeters with substantially no chromatic aberration.

To attain the above-described object, the present invention provides a concentric optical system which includes at least two, first and second, optical components having at least two semitransparent reflecting surfaces, each having a concave surface directed toward a pupil plane. The semitransparent reflecting surfaces are disposed so that each semitransparent reflecting surface transmits light rays at least once and reflects them at least once. The first and second optical components are different in dispersion from each other. A pupil that is formed by the first and second optical components lies outside the range of from the foremost surface to the rearmost surface of the optical system.

With the above-described arrangement of the present invention, the pupil position is provided outside the range of from the foremost surface to the rearmost surface of the optical system, thereby enabling an increase in the degree of freedom of aberration correction. In addition, since the arrangement is simple, the productivity can be effectively improved, and the production cost can also be reduced.

In addition, the present invention provides a concentric optical system which includes a first optical component and a second optical component. The first optical component has a first semitransparent reflecting surface which has a center of curvature disposed substantially on an optical axis, and which has a concave surface directed toward the center of curvature. The first optical component is formed from a medium having a refractive index (n) larger than 1 (n>1). The second optical component has a second semitransparent reflecting surface which has a center of curvature disposed at approximately the same position as the center of curvature of the first semitransparent reflecting surface. The second optical component is formed from a medium having a refractive index (n) larger than 1 (n>1). The medium of the first optical component and the medium of the second optical component are different in dispersion from each other. In addition, a pupil that is formed by the first and second optical components lies outside the range of from the foremost surface to the rearmost surface of the optical system.

In addition, the present invention provides a concentric optical system which includes a first optical component having a first semitransparent reflecting surface, and a second optical component having a second semitransparent reflecting surface. The first and second semitransparent reflecting surfaces have respective centers of curvature disposed at approximately the same position. The first and second optical components are different in dispersion from each other. The first and second semitransparent reflecting surfaces are arranged so that a bundle of light rays passing through the first semitransparent reflecting surface is reflected by the second semitransparent reflecting surface, and the bundle of light rays reflected by the second semitransparent reflecting surface is reflected by the first semitransparent reflecting surface and then passes through the second semitransparent reflecting surface. In addition, a pupil that is formed by the first and second optical components lies outside the range of from the foremost surface to the rearmost surface of the optical system.

In the above-described arrangements, it is preferable that the at least two optical components, which are different in dispersion from each other, lie adjacent to each other.

Each semitransparent reflecting surface preferably has a transmittance in the range of from 20% to 80%.

It is preferable to dispose a device which is composed of polarizing optical elements so as to cut off light rays passing through the at least two semitransparent reflecting surfaces without being reflected by either of them.

The above-described concentric optical systems may be usable as either an ocular optical system or an imaging optical system.

Further, it is preferable to satisfy the following condition:

$$0.2 < v_1/v_2 < 1.00 \qquad (1)$$

where $v_1$ is the Abbe's number of the first optical component, and $V_2$ is the Abbe's number of the second optical component.

When the field angle in each of the vertical and horizontal directions is 40° or more, it is preferable to satisfy the following condition:

$$0.5 < v_1/v_2 < 0.98 \qquad (2)$$

When the field angle in each of the vertical and horizontal directions is 40° or more, and the pupil diameter is 10 millimeters or more, it is preferable to satisfy the following condition:

$$0.5 < v_1/v_2 < 0.95 \qquad (3)$$

The reason for adopting the above-described arrangements in the present invention and the functions thereof will be explained below.

The concentric optical system of the present invention will be explained below as an imaging optical system for the sake of convenience. However, it is easy to use the concentric optical system as an ocular optical system by modifying the arrangement such that the image surface in the optical system of the present invention formed as an imaging optical system is replaced by an object point. Thus, it will be clear that the present invention has constituent features required to form an ocular optical system. That is, the concentric optical system of the present invention can also function as an ocular optical system by inverting the arrangement of the imaging optical system described below.

In the above-described U.S. Reissued Pat. No. 27,356, the semitransparent concave mirror and the semitransparent plane mirror are each formed from a single independent constituent element. Therefore, when the field angle is widened, off-axis aberrations such as astigmatism, coma, etc. are likely to occur. In addition, the radius of curvature of the semitransparent concave mirror reduces, which is unfavorable from the manufacturing point of view in actual practice. In Japanese Patent Application No. 05-264828, which is a prior application filed by the present applicant, the space between the above-described constituent elements is filled with a glass or other vitreous material, thereby making the optical arrangement even more favorable from the manufacturing point of view. In addition, a semitransparent concave mirror is disposed in place of the semitransparent plane mirror, and the distance between the semitransparent concave mirror and the semitransparent convex mirror is increased, thereby succeeding in correcting field curvature and coma almost completely.

In U.S. Reissued Pat. No. 27,356, the optical elements having semitransparent surfaces can be handled as thin lenses, and therefore, chromatic aberration is not a serious problem. However, in the above-described prior application, a thick lens having two semitransparent curved surfaces is used, and therefore, the problem of chromatic aberration cannot be ignored. Accordingly, it is not easy to obtain an optical system which satisfies the demand for a wide field angle and a large pupil diameter.

Thus, it is necessary in order to obtain a wide field angle and a large pupil diameter to solve the problem of both axial chromatic aberration and lateral chromatic aberration. The causes of the two chromatic aberrations will be explained below with reference to FIG. 2, which shows a concentric optical system. In FIG. 2, the pupil position of the concentric optical system is denoted by reference numeral 1, a first semitransparent curved surface by 2, a second semitransparent curved surface by 3, and an image surface by 4. As shown in the figure, the first semitransparent curved surface 2 is disposed closer to the pupil plane 1, while the second semitransparent curved surface 3 is disposed away from the pupil plane 1. A point on the first semitransparent curved surface 2 at which an axial upper marginal ray a passes through the surface 2 is denoted by reference symbol a-1, and a point on the second semitransparent curved surface 3 at which the axial upper marginal ray a passes through the surface 3 is denoted by reference symbol a-2. A point on the first semitransparent curved surface 2 at which an extra-axial principal ray b passes through the surface 2 is denoted by reference symbol b-1, and a point on the second semitransparent curved surface 3 at which the extra-axial principal ray b passes through the surface 3 is denoted by reference symbol b-2.

First, the causes of lateral chromatic aberration will be explained. Herein, lateral chromatic aberration in which the magnification decreases as the wavelength becomes shorter is defined as positive lateral chromatic aberration, whereas lateral chromatic aberration in which the magnification increases as the wavelength becomes shorter is defined as negative lateral chromatic aberration. In a case where the thick lens having the two semitransparent curved surfaces 2 and 3 is formed from a single vitreous material, at the points b-1 and b-2 the ray is subjected to positive refracting action which increases as the wavelength becomes shorter. Accordingly, the magnification at the image surface 4 reduces, resulting in positive lateral chromatic aberration.

Next, the causes of axial chromatic aberration will be explained. Herein, axial chromatic aberration in which the focal length shortens as the wavelength becomes shorter is defined as positive axial chromatic aberration, whereas axial chromatic aberration in which the focal length lengthens as the wavelength becomes shorter is defined as negative axial chromatic aberration. At the point a-1, the first semitransparent curved surface 2 has negative power, and therefore, the ray is subjected to negative refracting action which increases as the wavelength becomes shorter, resulting in negative axial chromatic aberration. At the point a-2, the second semitransparent curved surface 3 has positive power, and therefore, the ray is subjected to positive refracting action which increases as the wavelength becomes shorter, resulting in positive axial chromatic aberration. Since the axial chromatic aberrations produced at the points a-1 and a-2 are opposite in direction to each other, these aberrations can cancel each other. However, the axial chromatic aberrations produced at the points a-1 and a-2 considerably differ in quantity from each other, so that these aberrations cannot be canceled by each other. The reason for this is as follows: The axial marginal ray height at the point a-1 is much greater than the axial marginal ray height at the point a-2. Accordingly, the amount of axial chromatic aberration produced at the point a-1 is much larger than the amount of axial chromatic aberration produced at the point a-2. Consequently, at the image surface 4, the focal length lengthens as the wavelength becomes shorter, resulting in negative axial chromatic aberration.

When the rays are reflected at the first and second semitransparent curved surfaces 2 and 3, no chromatic aberration is produced. Therefore, there is no effect on either of the axial and lateral chromatic aberrations, as a matter of course.

When the field angle is narrow, the radius of curvature of each semitransparent curved surface is large. Therefore, the axial chromatic aberration is a matter of little concern, and only the lateral chromatic aberration becomes a problem. When the field angle widens, the lateral chromatic aberration becomes further conspicuous. In addition, since the radius of curvature of each semitransparent curved surface reduces, the axial chromatic aberration also becomes conspicuous. That is, in a case where the thick lens having the two semitransparent curved surfaces 2 and 3 is formed from a single vitreous material, both the lateral and axial chromatic aberrations become problems, and it becomes essential, in order to obtain an image which is clear as far as the edges of the visual field, to effectively correct the lateral chromatic aberration in particular.

The present invention has succeeded in correcting both the lateral and axial chromatic aberrations with good balance and thereby obtaining an image surface of high resolution even in a case where the concentric optical system is formed by using a thick lens having two semitransparent curved surfaces.

The chromatic aberration correcting scheme of the present invention will be explained below with reference to FIG. 1. In order to correct chromatic aberration, the vitreous material that fills the space between the two semitransparent curved surfaces 2 and 3 must be formed from vitreous materials which are different in dispersion (Abbe's number) from each other. The basic principle of the chromatic aberration correcting scheme will be explained below. Referring to FIG. 1, the cemented surface between the different vitreous materials is denoted by reference numeral 5. A point on the first semitransparent curved surface 2 (which is closer to the pupil plane 1) at which the axial upper marginal ray a passes through the surface 2 is denoted by reference symbol a-1. Points on the cemented surface 5 at which the axial upper marginal ray a passes through the surface 5 for the first, second and third time are denoted by reference symbols a-2, a-3, and a-4, respectively. A point on the second semitransparent curved surface 3 (which is away from the pupil plane 1) at which the axial upper margin ray a passes through the surface 3 is denoted by reference symbol a-5. A point on the first semitransparent curved surface 2 at which an extra-axial principal ray b passes through the surface 2 is denoted by reference symbol b-1. Points on the cemented surface 5 at which the extra-axial principal ray b passes through the surface 5 for the first, second and third time are denoted by reference symbols b-2, b-3, and b-4, respectively. A point on the second semitransparent curved surface 3 at which the extra-axial principal ray b passes through the surface 3 is denoted by reference symbol b-5.

First, the method of correcting lateral chromatic aberration will be explained. The extra-axial ray bundle b first passes through the first semitransparent curved surface 2, which is closer to the pupil plane 1, and then passes through the second semitransparent curved surface 3, which is away from the pupil plane 1, after passing through the cemented surface 5 of the optical system three times, which is formed from vitreous materials of different dispersion. Thus, the positive lateral chromatic aberration produced at the points b-1 and b-5 is canceled by negative lateral chromatic aberration produced at the points b-2, b-3 and b-4, thereby enabling the lateral chromatic aberration to be corrected at the image surface 4. More specifically, it is preferable to satisfy the following condition:

$$\nu_1/\nu_2$$

where $\nu_1$ is the Abbe's number of a lens system that constitutes the semitransparent curved surface 2, which is closer to the pupil plane 1, and $\nu_2$ is the Abbe's number of a lens system that constitutes the semitransparent curved surface 3, which is away from the pupil plane 1.

With the above-described arrangement, negative lateral chromatic aberration is produced at the points b-2, b-3 and b-4 so as to cancel the positive lateral chromatic aberration produced at the points b-1 and b-5.

However, if the optical system is arranged so as to satisfy the condition of $\nu_1 < \nu_2$ to correct the lateral chromatic aberration, it becomes difficult to effectively correct the axial chromatic aberration. The reason for this is as follows: At the points a-2 and a-3, negative axial chromatic aberration is produced, whereas, at the point a-4, positive axial chromatic aberration is produced. Therefore, it is difficult to completely cancel the large amount of negative axial chromatic aberration produced at the point a-1.

Next, the method of correcting axial chromatic aberration will be explained. To correct axial chromatic aberration completely, it is necessary to satisfy the following condition:

$$\nu_1 > \nu_2$$

If the condition is satisfied, positive axial chromatic aberration is produced at the points a-2 and a-3, whereas, at the point a-4, negative axial chromatic aberration is produced. Accordingly, the negative axial chromatic aberration produced at the point a-1 can be canceled almost completely.

However, if the optical system is arranged so as to satisfy the condition of $\nu_1 > \nu_2$ to correct the axial chromatic aberration, it becomes difficult to effectively correct the lateral chromatic aberration. The reason for this is that at all the points b-2, b-3 and b-4, positive lateral chromatic aberration is produced, and it becomes impossible to cancel the positive lateral chromatic aberration produced at the points b-1 and b-5.

As described above, the lateral chromatic aberration correcting scheme and the axial chromatic aberration correcting scheme run counter to each other. Therefore, it is difficult to correct both the chromatic aberrations simultaneously. To cope with the demand for achievement of a wide field angle, it is important to minimize axial chromatic aberration while effectively correcting lateral chromatic aberration. Accordingly, it is essential to correct lateral chromatic aberration with priority to axial chromatic aberration by setting the Abbe's numbers of the optical components of the optical system so as to satisfy the condition of $v_1 < v_2$.

When the Abbe's numbers of the optical components of the optical system are set so as to satisfy the condition $v_1 < v_2$, if the value of $v_1/v_2$ is small, sufficiently large negative lateral chromatic aberration can be produced at the points b-2, b-3 and b-4 to cancel the positive lateral chromatic aberration produced at the points b-1 and b-5. In this case, however, the negative axial chromatic aberration produced at the points a-2 and a-3 becomes excessively large, so that the negative axial chromatic aberration produced at the point a-1 is undesirably multiplied. Conversely, if the value of $v_1/v_2$ is excessively large when the Abbe's numbers of the optical components of the optical system are set so as to satisfy the condition $v_1 < v_2$, it is possible to suppress the negative axial chromatic aberration produced at the points a-2 and a-3, and hence possible to reduce the amount of negative axial chromatic aberration produced in the entire optical system. In this case, however, the amount of negative lateral chromatic aberration produced at the points b-2, b-3 and b-4 is insufficient, so that the positive lateral chromatic aberration undesirably remains uncorrected in the optical system.

To correct both lateral and axial chromatic aberrations with good balance, it is essential to satisfy the following condition:

$$0.2 < v_1/v_2 > 1.00 \qquad (1)$$

If the relationship between the Abbe's numbers of the vitreous materials of the lenses constituting the optical system, i.e. $v_1/v_2$, is not larger than the lower limit of the above condition, i.e. 0.2, an excessively large amount of axial chromatic aberration is produced, resulting in an increase in the chromatic difference of focus (i.e. the amount of shift of focus according to color). Conversely, if $v_1/v_2$ is not smaller than the upper limit of the above condition, i.e. 1.00, an excessively large amount of lateral chromatic aberration is produced, resulting in an increase in the chromatic difference of magnification (i.e. the amount of deviation of magnification according to color). Accordingly, $v_1/v_2$ which falls outside the range of the above condition is unfavorable from the viewpoint of practical use.

In a case where an image of higher resolution is required, the axial and lateral chromatic aberrations must be corrected with better balance. Therefore, it is preferable to satisfy the following condition:

$$0.4 < v_1/v_2 < 0.98 \qquad (1')$$

The upper and lower limits of the above condition have been set for the reasons stated above.

When a wide field angle of 40° or more is required, there must be an increase in the angle of incidence of the extra-axial principal ray b on the first semitransparent curved surface 2, which is closer to the pupil plane 1, and also on the second semitransparent curved surface 3, which is away from the pupil plane 1. Accordingly, astigmatism is likely to occur. In addition, a wide field angle of 40° or more causes an increase of the difference between the angles of incidence of extra-axial upper and lower ray bundles on each of the semitransparent curved surfaces 2 and 3. Therefore, occurrence of comatic aberration is unavoidable. When a wide field angle of 40° or more is required, it is necessary, in order to minimize the amount of astigmatism and coma produced in the optical system, to reduce the radii of curvature of the two semitransparent curved surfaces 2 and 3 to thereby reduce the angle of incidence of the extra-axial ray bundle on the two semitransparent curved surfaces 2 and 3. By doing so, however, the axial ray bundle is subjected to larger refracting action by the two semitransparent curved surfaces 2 and 3. Consequently, the dispersion of the axial ray bundle inevitably becomes large, resulting in an increase of the chromatic difference of focus. It is necessary in order to obtain a clear image not only to effectively correct off-axis aberrations such as astigmatism and coma but also to minimize the chromatic difference of focus. To minimize the chromatic difference of focus, it is necessary to reduce the difference between the Abbe's numbers of the optical components constituting the semitransparent curved surfaces 2 and 3. Therefore, when a wide field angle of 40° or more is required, it is essential to satisfy the following condition:

$$0.5 < v_1/v_2 < 0.98 \qquad (2)$$

The upper and lower limits of the above condition have been set for the reasons stated above.

In a case where an image of higher resolution is required, the chromatic difference of focus should preferably be further minimized. Therefore, it is essential to satisfy the following condition:

$$0.6 < v_1/v_2 < 0.98 \qquad (2')$$

The upper and lower limits of the above condition have been set for the reasons stated above.

When a wide field angle of 40° or more is given, the pupil may be frequently rolled to observe the edges of the visual field. In this case, if a sufficiently large pupil diameter is not given, the edges of the visual field look unsharp. Thus, it becomes impossible to clearly observe the edges of the visual field. Therefore, in a case where a wide field angle is provided, and there are many occasions to observe the edges of the visual field, a large pupil diameter is required.

Increase of the pupil diameter causes an increase in the difference between the refracting action which the rim portion of the axial ray bundle undergoes and the refracting action which the paraxial portion of the axial ray bundle undergoes at the semitransparent curved surface 2, which is closer to the pupil plane 1, and also at the semitransparent curved surface 3, which is away from the pupil plane 1. Accordingly, spherical aberration is likely to occur. In addition, there is a further increase in the difference between the angle of incidence of the extra-axial upper ray bundle and that of the extra-axial lower ray bundle at the two semitransparent curved surfaces 2 and 3. Therefore, coma is likely to occur. When the field angle is as wide as 40° or more, and the pupil diameter is as large as 10 millimeters or more, the radii of curvature of the two semitransparent curved surfaces 2 and 3 must be increased in order to effectively correct both spherical and comatic aberrations. By doing so, the refracting action which the axial ray bundle undergoes at the two semitransparent curved surfaces 2 and 3 reduces, and the difference between the incidence angles of the extra-axial upper and lower ray bundles also reduces. Accordingly, it becomes possible to minimize the amount of spherical and comatic aberration produced in the optical system.

On the other hand, since the angle of incidence of the extra-axial principal ray b on the two semitransparent curved surfaces 2 and 3 increases, the extra-axial principal ray b is considerably refracted at the two semitransparent curved surfaces 2 and 3, resulting in an increase in the dispersion of the extra-axial principal ray b, and thus causing an increase in the chromatic difference of magnification. To minimize the chromatic difference of magnification, it is essential to increase the difference between the Abbe's numbers of the optical components constituting the two semitransparent curved surfaces 2 and 3. Therefore, when the field angle is 40° or more, and the pupil diameter is 10 millimeters or more, it is essential to satisfy the following condition:

$$0.5 < v_1/v_2 < 0.95 \quad (3)$$

The upper and lower limits of the above condition have been set for the reasons stated above.

In a case where an image of higher resolution is required, the chromatic difference of magnification should preferably be further minimized. Therefore, it is essential to satisfy the following condition:

$$0.5 < v_1/v_2 < 0.90 \quad (3')$$

The upper and lower limits of the above condition have been set for the reasons stated above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 12(a) to 12(d) (10) graphically show spherical aberration, astigmatism, distortion and lateral aberration in Example 1.

FIGS. 13(a) to 13(d) (10) graphically show various aberrations in Example 2 in the same way as in FIGS. 12(a) to 12(d) (10).

FIGS. 14(a) to 14(d) (10) graphically show various aberrations in Example 3 in the same way as in FIGS. 12(a) to 12(d) (10).

FIGS. 15(a) to 15(d) (10) graphically show various aberrations in Example 4 in the same way as in FIGS. 12(a) to 12(d) (10).

FIGS. 16(a) to 16(d) (10) graphically show various aberrations in Example 5 in the same way as in FIGS. 12(a) to 12(d) (10).

FIGS. 17(a) to 17(d) (10) graphically show various aberrations in Example 6 in the same way as in FIGS. 12(a) to 12(d) (10).

FIGS. 18(a) to 18(d) (10) graphically show various aberrations in Example 7 in the same way as in FIGS. 12(a) to 12(d) (10).

FIGS. 19(a) to 19(d) (10) graphically show various aberrations in Example 8 in the same way as in FIGS. 12(a) to 12(d) (10).

FIGS. 20(a) to 20(d) (10) graphically show various aberrations in Example 9 in the same way as in FIGS. 12(a) to 12(d) (10).

DESCRIPTION OF THE PREFERRED EMBODIMENTS

Examples 1 to 9 of the concentric optical system according to the present invention will be described below with reference to the accompanying drawings.

EXAMPLE 1

Figure 1:
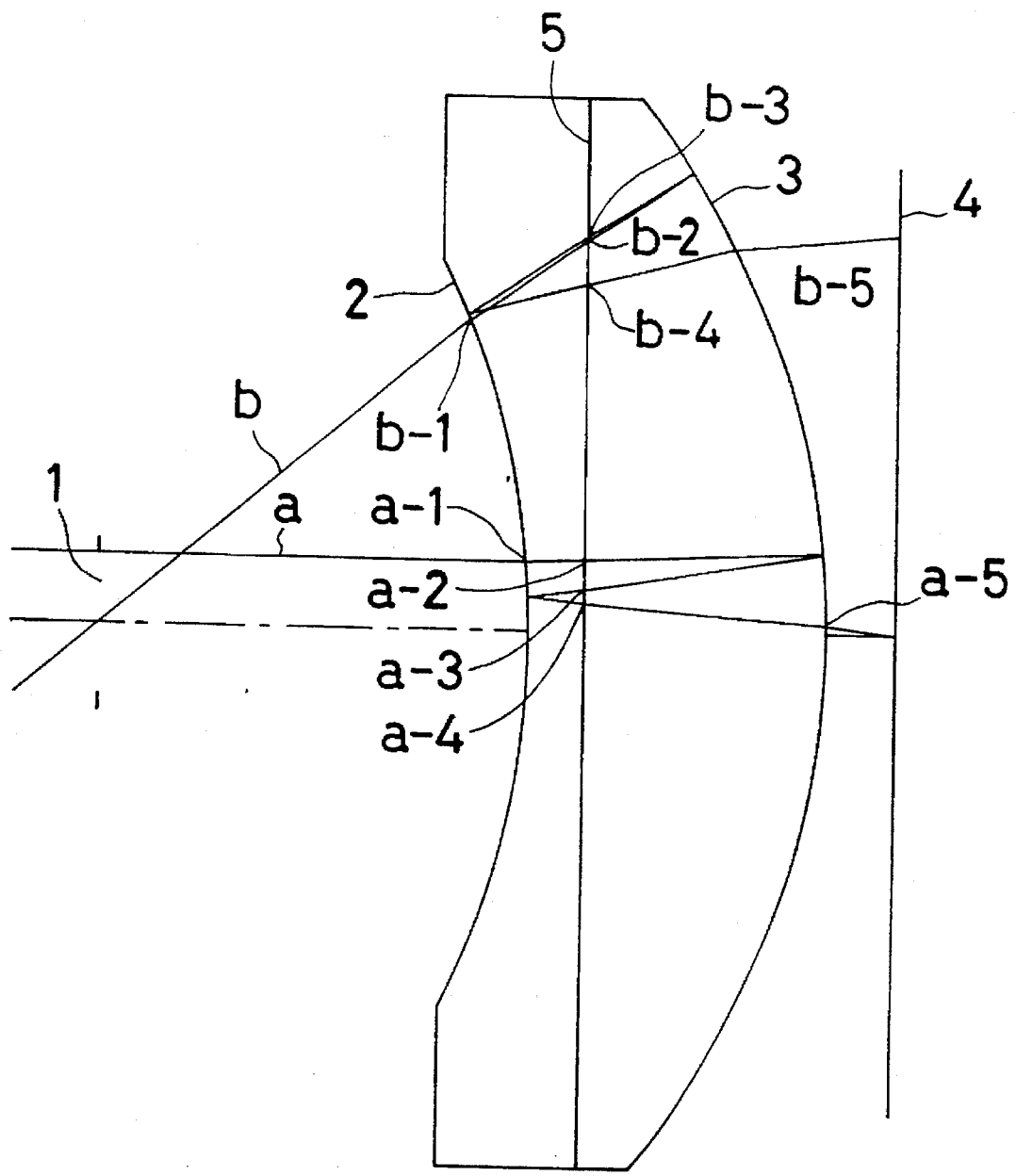
FIG. 1 is a view used to explain the basic arrangement of the concentric optical system according to the present invention and the reason why the amount of chromatic aberration produced in the concentric optical system is small.
Figure 2:
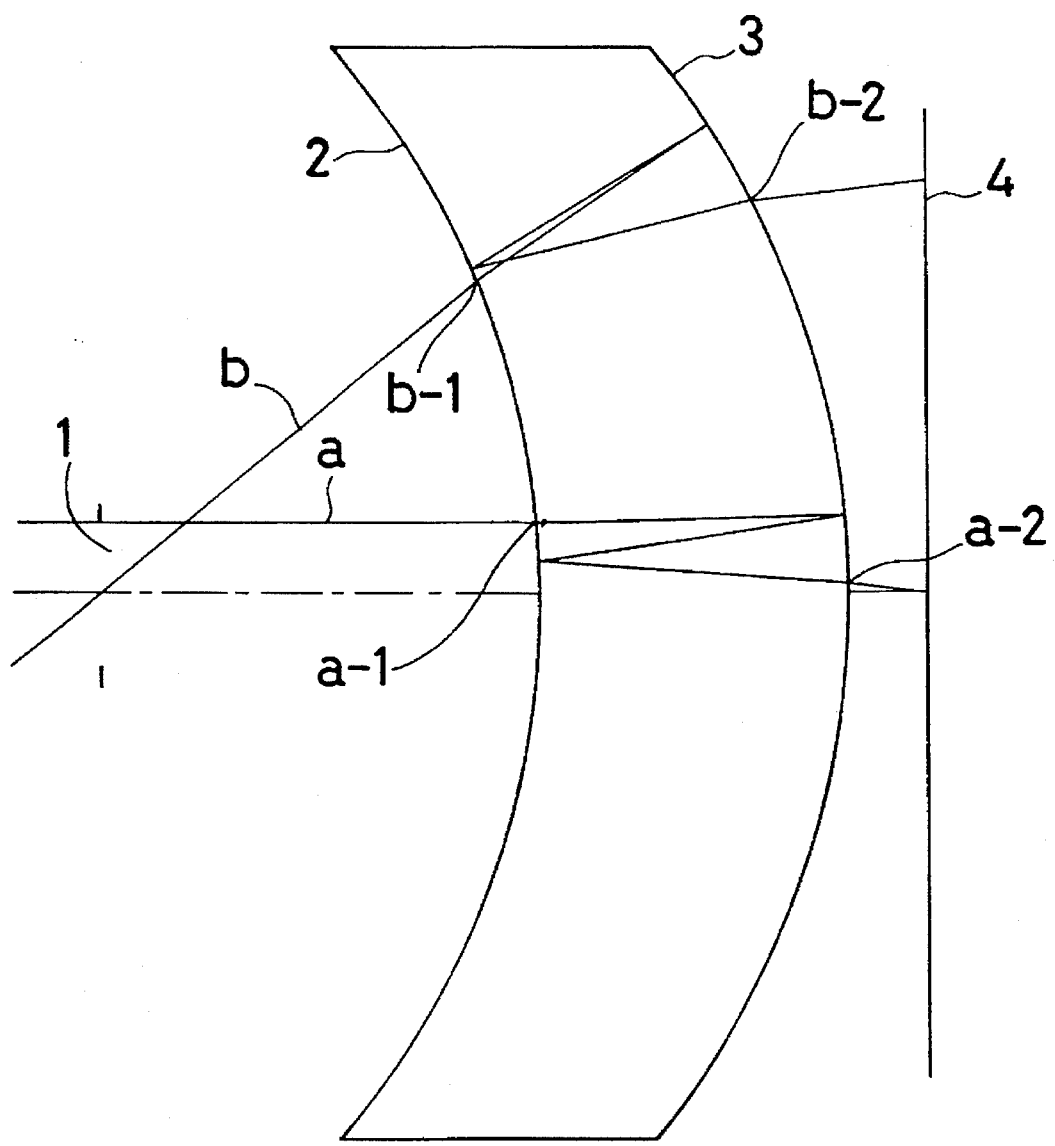
FIG. 2 is a view used to explain the reasons for chromatic aberration produced in a concentric optical system which is formed from a single vitreous material.
Figure 3:
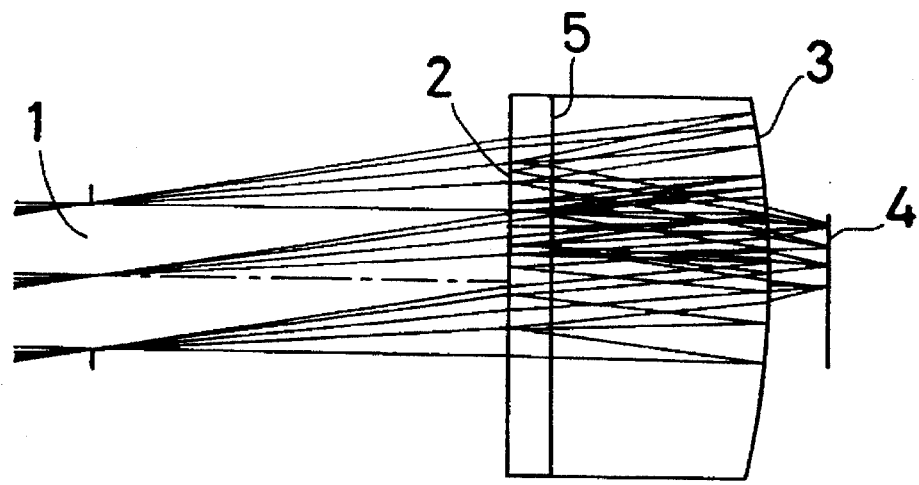
FIG. 3 is a sectional view of Example 1 of the concentric optical system according to the present invention.

Example 1 of the present invention will be explained below with reference to FIG. 3. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later. In the following numerical data, nd denotes the refractive index of the lens for the spectral d-line, and vd denotes the Abbe's number (the same shall apply hereinafter).

In this example, the field angle is 20°, the pupil diameter is 15 millimeters, the focal length is 40 millimeters, and F-number is 2.7. The value of the condition $v_1/v_2$ is 0.448.

FIGS. 12(a) (1), 12(b), 12(c) and 12(d) (10) graphically show spherical aberration, astigmatism, distortion and lateral aberration, respectively, in this example.

EXAMPLE 2

Figure 4:
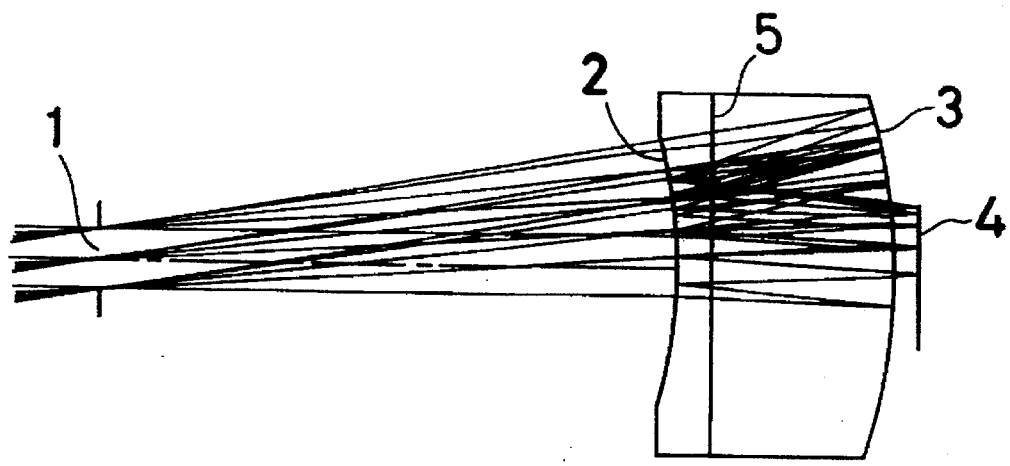
FIG. 4 is a sectional view of Example 2 of the present invention.

Example 2 of the present invention will be explained below with reference to FIG. 4. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later.

In this example, the field angle is 20°, the pupil diameter is 6 millimeters, the focal length is 40 millimeters, and F-number is 6.7. The value of the condition $v_1/v_2$ is 0.971.

FIGS. 13(a) to 13(d) (10) graphically show various aberrations in this example in the same way as in FIGS. 12(a) to 12(d) (10).

EXAMPLE 3

Figure 5:
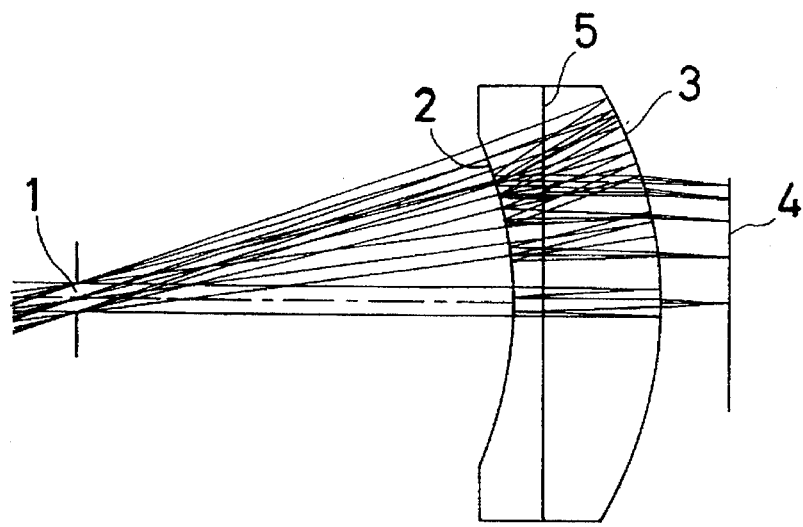
FIG. 5 is a sectional view of Example 3 of the present invention.

Example 3 of the present invention will be explained below with reference to FIG. 5. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later.

In this example, the field angle is 40°, the pupil diameter is 3 millimeters, the focal length is 40 millimeters, and F-number is 13.3. The value of the condition $v_1/v_2$ is 0.931.

FIGS. 14(a) to 14(d) (10) graphically show various aberrations in this example in the same way as in FIGS. 12(a) to 12(d) (10).

EXAMPLE 4

Figure 6:
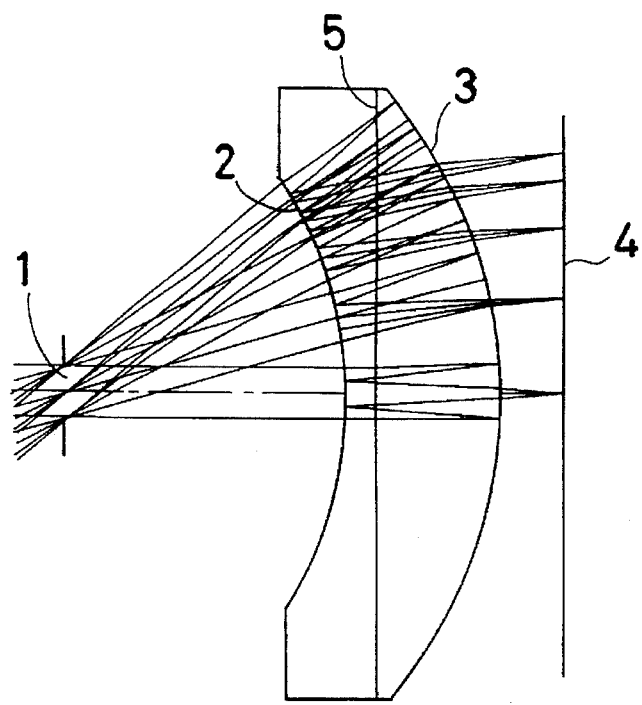
FIG. 6 is a sectional view of Example 4 of the present invention.

Example 4 of the present invention will be explained below with reference to FIG. 6. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later.

In this example, the field angle is 80°, the pupil diameter is 6 millimeters, the focal length is 40 millimeters, and F-number is 6.7. The value of the condition $v_1/v_2$ is 0.835.

FIGS. 15(a) to 15(d) (10) graphically show various aberrations in this example in the same way as in FIGS. 12(a) to 12(d) (10).

EXAMPLE 5

Figure 7:
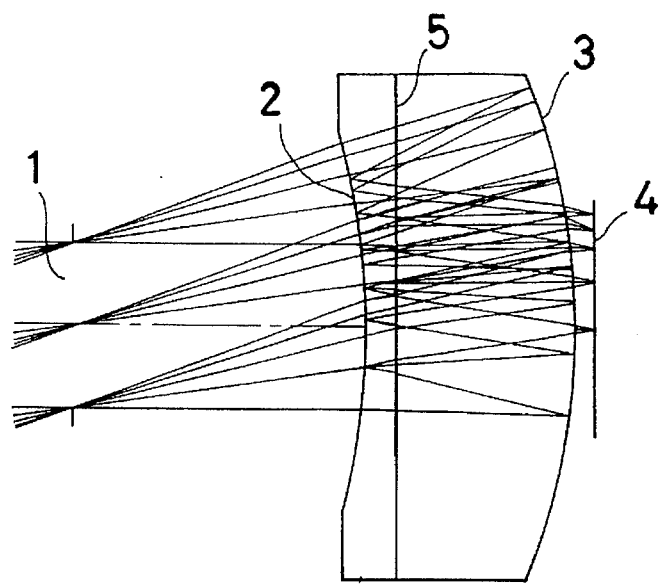
FIG. 7 is a sectional view of Example 5 of the present invention.

Example 5 of the present invention will be explained below with reference to FIG. 7. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later.

In this example, the field angle is 40°, the pupil diameter is 20 millimeters, the focal length is 40 millimeters, and F-number is 2.0. The value of the condition $v_1/v_2$ is 0.695.

FIGS. 16(a) to 16(d) (10) graphically show various aberrations in this example in the same way as in FIGS. 12(a) to 12(d) (10).

EXAMPLE 6

Figure 8:
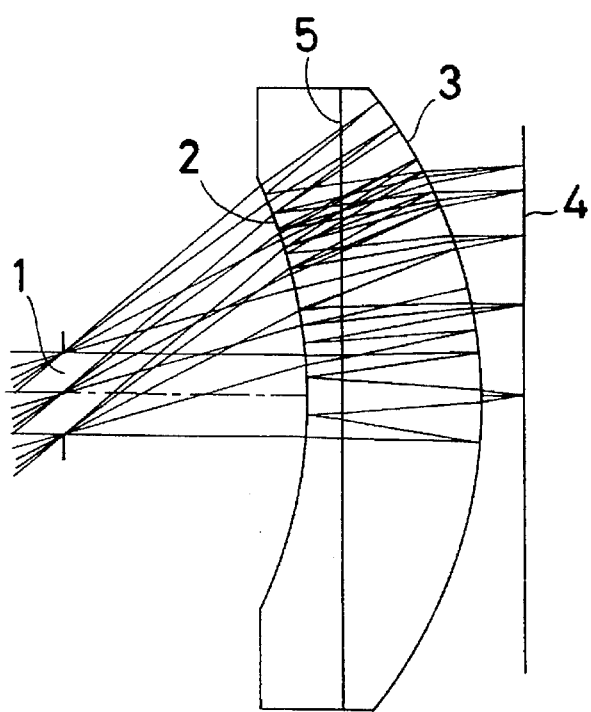
FIG. 8 is a sectional view of Example 6 of the present invention.

Example 6 of the present invention will be explained below with reference to FIG. 8. In the figure, reference numeral 1 denotes a pupil position, 2 a first semitransparent reflecting surface, 3 a second semitransparent reflecting surface, 4 an image surface, and 5 a cemented surface. Examples of numerical values in this example will be shown later.

In this example, the field angle is 80°, the pupil diameter is 10 millimeters, the focal length is 40 millimeters, and F-number is 4.0. The value of the condition $v_1/v_2$ is 0.798.

FIGS. 17(a) to 17(d) (10) graphically show various aberrations in this example in the same way as in FIGS. 12(a) to 12(d) (10).

EXAMPLE 7

Figure 9:
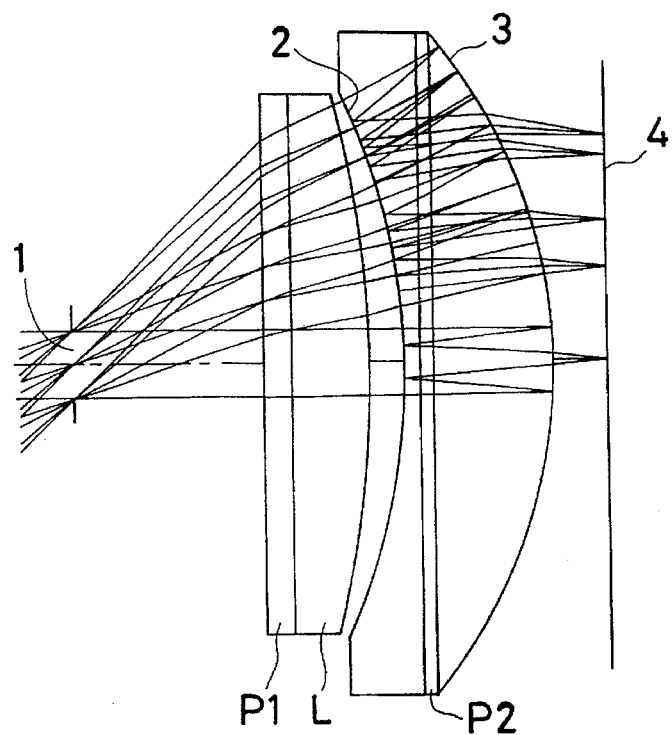
FIG. 9 is a sectional view of Example 7 of the present invention.

Example 7 of the present invention will be explained below with reference to FIG. 9. In the figure, reference numeral 1 denotes a pupil position, 2 a first semitransparent reflecting surface, 3 a second semitransparent reflecting surface, 4 an image surface, and 5 a cemented surface. Reference symbols P1 and P2 denote polarizing optical elements, for example, polarizing plates, quarter-wave plates, etc. (as one specific example, P1 is a polarizing optical element having a polarizing plate stacked on the pupil side thereof and a quarter-wave plate stacked on the image surface side thereof; and P2 is a quarter-wave plate). In this example, the polarizing optical elements P1 and P2 are disposed to cut off flare light that passes through the first and second semitransparent reflecting surfaces 2 and 3 and reaches the image surface 4 without being reflected by either of the first and second semitransparent reflecting surfaces 2 and 3. Further, in this example, a plano-convex lens L is disposed between the pupil position 1 and the first semitransparent reflecting surface 2. Examples of numerical values in this example will be shown later.

In this example, the field angle is 90°, the pupil diameter is 10 millimeters, the focal length is 45 millimeters, and F-number is 4.5. The value of the condition $v_1/v_2$ is 0.552.

FIGS. 18(a) to 18(d) (10) graphically show various aberrations in this example in the same way as in FIGS. 12(a) to 12(d) (10).

EXAMPLE 8

Figure 10:
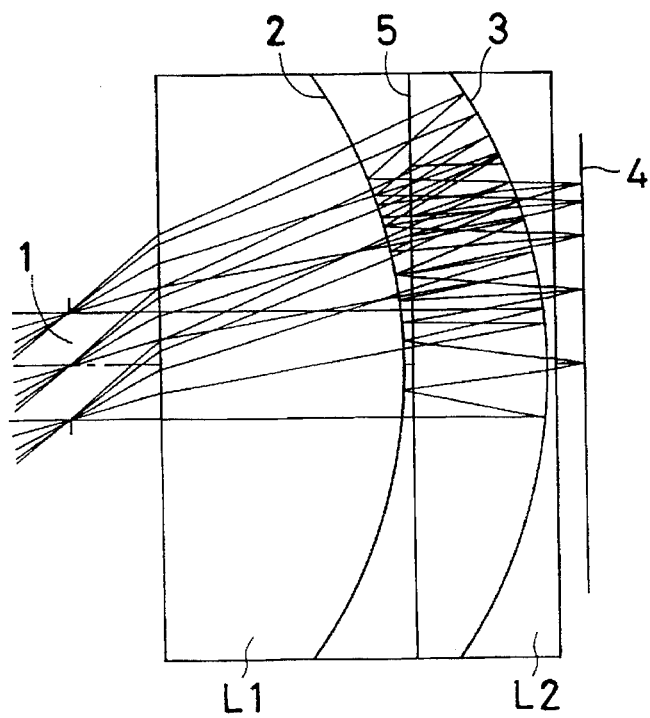
FIG. 10 is a sectional view of Example 8 of the present invention.

Example 8 of the present invention will be explained below with reference to FIG. 10. In the figure, reference numeral 1 denotes a pupil position, 2 a first semitransparent reflecting surface, 3 a second semitransparent reflecting surface, 4 an image surface, and 5 a cemented surface. Reference symbols L1 and L2 denote lenses. In this example, the lenses L1 and L2 are cemented to both sides, respectively, of a thick lens having the two semitransparent curved surfaces 2 and 3 in order to correct off-axis aberrations, e.g. coma and astigmatism, even more effectively. Examples of numerical values in this example will be shown later.

In this example, the field angle is 80°, the pupil diameter is 8 millimeters, the focal length is 20 millimeters, and F-number is 2.5. The value of the condition $v_1/v_2$ is 0.674.

FIGS. 19(a) to 19(d) (10) graphically show various aberrations in this example in the same way as in FIGS. 12(a) to 12(d) (10).

EXAMPLE 9

Figure 11:
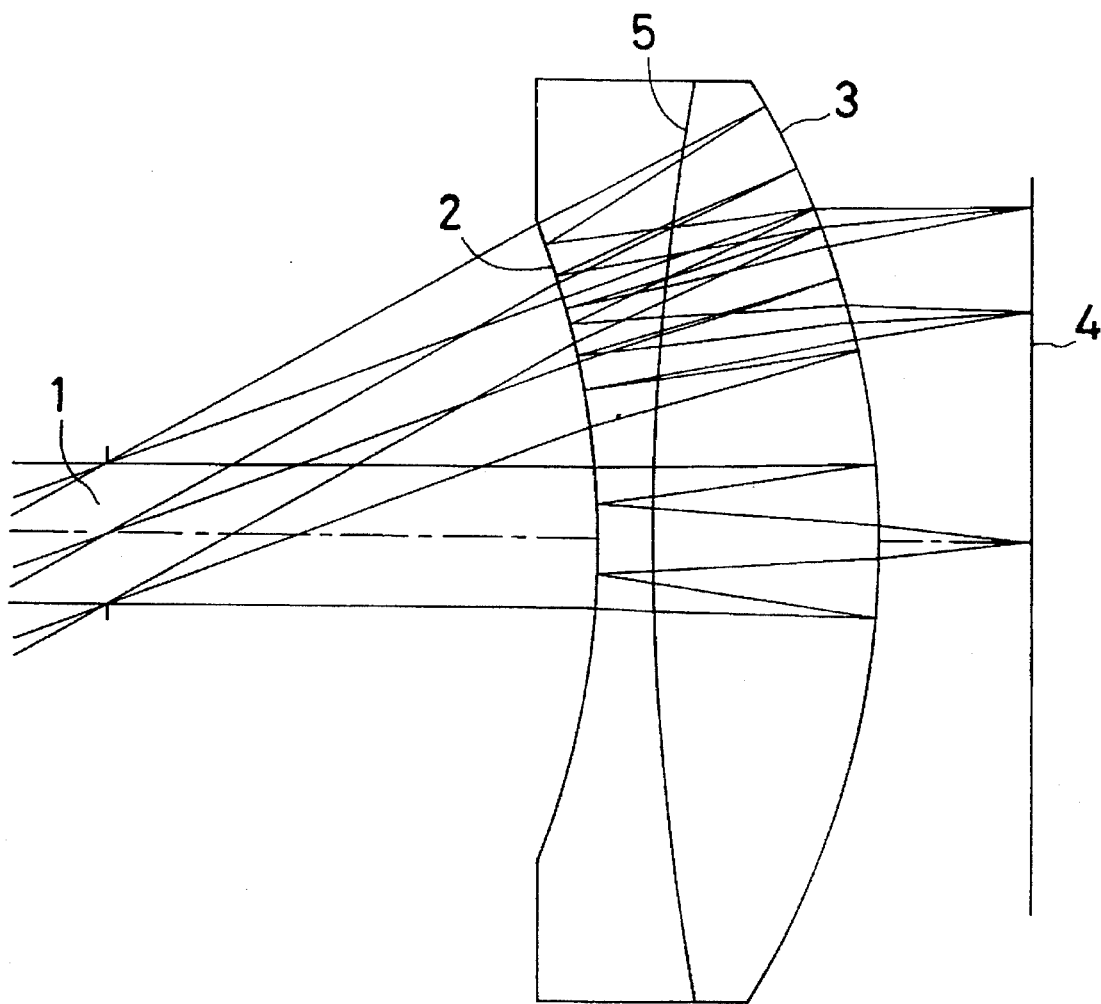
FIG. 11 is a sectional view of Example 9 of the present invention.

Example 9 of the present invention will be explained below with reference to FIG. 11. In the figure, reference numeral 1 denotes a pupil position, 2 a first semitransparent reflecting surface, 3 a second semitransparent reflecting surface, 4 an image surface, and 5 a cemented surface. In this example, power is given to the cemented surface 5 between two vitreous materials which are different in dispersion from each other. Examples of numerical values in this example will be shown later.

In this example, the field angle is 60°, the pupil diameter is 10 millimeters, the focal length is 45 millimeters, and F-number is 4.0. The value of the condition $v_1/v_2$ is 0.851.

FIGS. 20(a) to 20(d) (10) graphically show various aberrations in this example in the same way as in FIGS. 12(a) to 12(d) (10).

Numerical data in the above-described examples will be shown below.

| Surface No. | Curvature radius | Surface separation | nd | vd |
|---|---|---|---|---|
| Example 1 | | | | |
| 1 | pupil position 1 | 43.326 | | |
| 2 | -443.9127 | 4.000 | 1.7158 | 29.4 |
| 3 | ∞ | 21.915 | 1.5382 | 65.5 |
| 4 | -104.8939 | -21.915 | 1.5382 | 65.5 |
| | (reflecting surface 3) | | | |
| 5 | ∞ | -4.000 | 1.7158 | 29.4 |
| 6 | -443.9127 | 4.000 | 1.7158 | 29.4 |
| | (reflecting surface 2) | | | |
| 7 | ∞ | 21.915 | 1.5382 | 65.5 |
| 8 | -104.8939 | 6.111 | | |
| 9 | image surface 4 | | | |
| Example 2 | | | | |
| 1 | pupil position 1 | 59.272 | | |
| 2 | -60.9542 | 4.000 | 1.4904 | 68.3 |
| 3 | ∞ | 18.777 | 1.4870 | 70.4 |
| 4 | -62.4049 | -18.777 | 1.4870 | 70.4 |
| | (reflecting surface 3) | | | |
| 5 | ∞ | -4.000 | 1.4904 | 68.3 |
| 6 | -60.9542 | 4.000 | 1.4904 | 68.3 |
| | (reflecting surface 2) | | | |
| 7 | ∞ | 18.777 | 1.4870 | 70.4 |
| 8 | -62.4049 | 2.000 | | |
| 9 | image surface 4 | | | |
| Example 3 | | | | |
| 1 | pupil position 1 | 52.095 | | |
| 2 | -52.7218 | 4.000 | 1.4971 | 65.5 |
| 3 | ∞ | 13.778 | 1.4870 | 70.4 |
| 4 | -54.4350 | -13.778 | 1.4870 | 70.4 |
| | (reflecting surface 3) | | | |
| 5 | ∞ | -4.000 | 1.4971 | 65.5 |
| 6 | -52.7218 | 4.000 | 1.4971 | 65.5 |
| | (reflecting surface 2) | | | |
| 7 | ∞ | 13.778 | 1.4870 | 70.4 |
| 8 | -54.4350 | 9.004 | | |
| 9 | image surface 4 | | | |
| Example 4 | | | | |
| 1 | pupil position 1 | 33.277 | | |
| 2 | -54.0726 | 4.000 | 1.5181 | 55.8 |
| 3 | ∞ | 15.236 | 1.5227 | 66.8 |
| 4 | -56.9032 | -15.236 | 1.5227 | 66.8 |
| | (reflecting surface 3) | | | |
| 5 | ∞ | -4.000 | 1.5181 | 55.8 |
| 6 | -54.0726 | 4.000 | 1.5181 | 55.8 |
| | (reflecting surface 2) | | | |
| 7 | ∞ | 15.236 | 1.5227 | 66.8 |
| 8 | -56.9032 | 7.590 | | |
| 9 | image surface 4 | | | |
| Example 5 | | | | |
| 1 | pupil position 1 | 36.711 | | |
| 2 | -100.9813 | 4.000 | 1.5768 | 41.9 |
| 3 | ∞ | 22.553 | 1.6200 | 60.3 |
| 4 | -79.5946 | -22.553 | 1.6200 | 60.3 |
| | (reflecting surface 3) | | | |
| 5 | ∞ | -4.000 | 1.5768 | 41.9 |
| 6 | -100.9813 | 4.000 | 1.5768 | 41.9 |
| | (reflecting surface 2) | | | |
| 7 | ∞ | 22.553 | 1.6200 | 60.3 |
| 8 | -79.5946 | 2.000 | | |
| 9 | image surface 4 | | | |

-continued

| Surface No. | Curvature radius | Surface separation | nd | vd |
|---|---|---|---|---|
| Example 6 | | | | |
| 1 | pupil position 1 | 31.098 | | |
| 2 | -58.3138 | 4.000 | 1.5292 | 52.2 |
| 3 | ∞ | 17.350 | 1.5399 | 65.4 |
| 4 | -60.7829 | -17.350 | 1.5399 | 65.4 |
| | (reflecting surface 3) | | | |
| 5 | ∞ | -4.000 | 1.5292 | 52.2 |
| 6 | -58.3138 | 4.000 | 1.5292 | 52.2 |
| | (reflecting surface 2) | | | |
| 7 | ∞ | 17.350 | 1.5399 | 65.4 |
| 8 | -60.7829 | 5.150 | | |
| 9 | image surface 4 | | | |
| Example 7 | | | | |
| 1 | pupil position 1 | 28.239 | | |
| 2 | ∞ | 4.000 | 1.5163 | 64.1 |
| 3 | ∞ (lensL) | 12.000 | 1.7550 | 27.6 |
| 4 | -164.4962 | 5.000 | | |
| 5 | -94.5660 | 2.000 | 1.6274 | 35.6 |
| 6 | ∞ | 2.000 | 1.5163 | 64.1 |
| 7 | ∞ | 17.969 | 1.5517 | 64.5 |
| 8 | -79.3677 | -17.969 | 1.5517 | 64.5 |
| | (reflecting surface 3) | | | |
| 9 | ∞ | -2.000 | 1.5163 | 64.1 |
| 10 | ∞ | -2.000 | 1.6274 | 35.6 |
| 11 | -94.5660 | 2.000 | 1.6274 | 35.6 |
| | (reflecting surface 2) | | | |
| 12 | ∞ | 2.000 | 1.5163 | 64.1 |
| 13 | ∞ | 17.969 | 1.5517 | 64.5 |
| 14 | -79.3677 | 8.085 | | |
| 15 | image surface 4 | | | |
| Example 8 | | | | |
| 1 | pupil position 1 | 6.998 | | |
| 2 | ∞ (lensL 1) | 18.000 | 1.5163 | 64.1 |
| 3 | -39.2062 | 0.750 | 1.6209 | 37.3 |
| 4 | ∞ | 10.033 | 1.6480 | 55.3 |
| 5 | -37.5176 | -10.033 | 1.6480 | 55.3 |
| | (reflecting surface 3) | | | |
| 6 | ∞ | -0.750 | 1.6209 | 37.3 |
| 7 | -39.2062 | 0.750 | 1.6209 | 37.3 |
| | (reflecting surface 2) | | | |
| 8 | ∞ | 10.033 | 1.6480 | 55.3 |
| 9 | -37.5176 (lensL 2) | 0.750 | 1.5163 | 64.1 |
| 10 | ∞ | 2.000 | | |
| 11 | image surface 4 | | | |
| Example 9 | | | | |
| 1 | pupil position 1 | 35.012 | | |
| 2 | -61.8973 | 4.000 | 1.5139 | 57.3 |
| 3 | 181.9043 | 16.203 | 1.5172 | 67.3 |
| 4 | -63.0690 | -16.203 | 1.5172 | 67.3 |
| | (reflecting surface 3) | | | |
| 5 | 181.9043 | -4.000 | 1.5139 | 57.3 |
| 6 | -61.8973 | 4.000 | 1.5139 | 57.3 |
| | (reflecting surface 2) | | | |
| 7 | 181.9043 | 16.203 | 1.5172 | 67.3 |
| 8 | -63.0690 | 10.761 | | |
| 9 | image surface 4 | | | |

Figure 21:
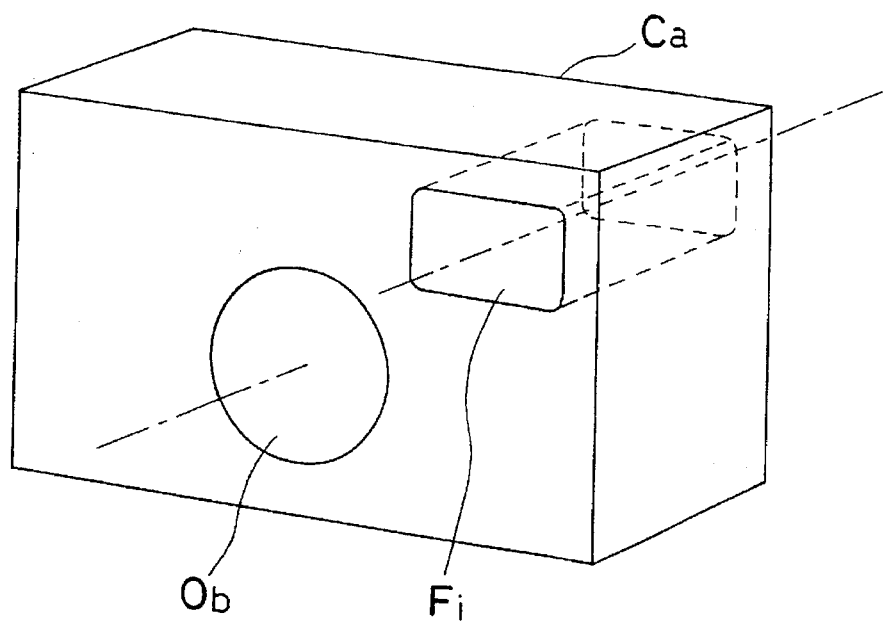
FIG. 21 is a perspective view of an example in which the concentric optical system of the present invention is used as an imaging optical system in a finder optical system of a compact camera.
Figure 22:
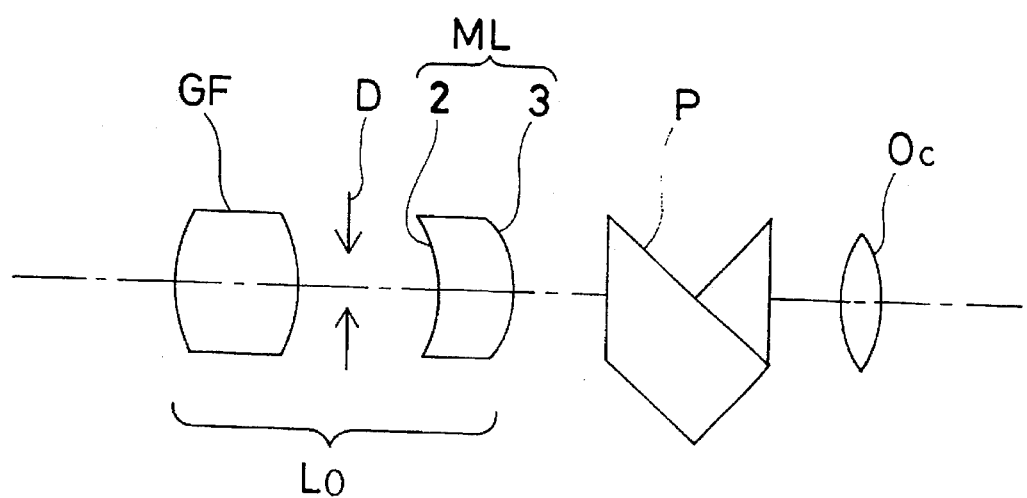
FIG. 22 is a sectional view of an example in which the concentric optical system of the present invention is used as a part of an objective.

It should be noted that the concentric optical system of the present invention may be provided as one lens in an ocular optical system or an imaging optical system. Alternatively, the concentric optical system alone may constitute an ocular optical system or an imaging optical system. Examples of such arrangements will be shown below. The concentric optical system of the present invention may be applied to imaging optical systems as follows: As shown, for example, in the perspective view of FIG. 21, the concentric optical system of the present invention may be used in a finder optical system $F_i$ of a compact camera $C_a$ in which a photographic optical system $O_b$ and the finder optical system $F_i$ are provided separately in substantially parallel to each other. Further, as shown in the sectional view of FIG. 22, a concentric optical system ML of the present invention, which is composed of first and second semitransparent reflecting surfaces 2 and 3, may be disposed behind a front lens group GF and an aperture diaphragm D with their centers of curvature made approximately coincident with the point of intersection between the plane of the diaphragm D and the optical axis, thereby constituting an objective lens system $L_o$. An image that is formed by the objective lens system $L_O$ is erected by a Porro prism erecting system, in which there are four reflections, provided at the observer side of the objective lens system $L_o$, thereby enabling an erect image to be observed through an ocular lens $O_e$.

Further, when used as an imaging optical system, the concentric optical system of the present invention may be arranged as a front-diaphragm optical system.

Figure 23A:
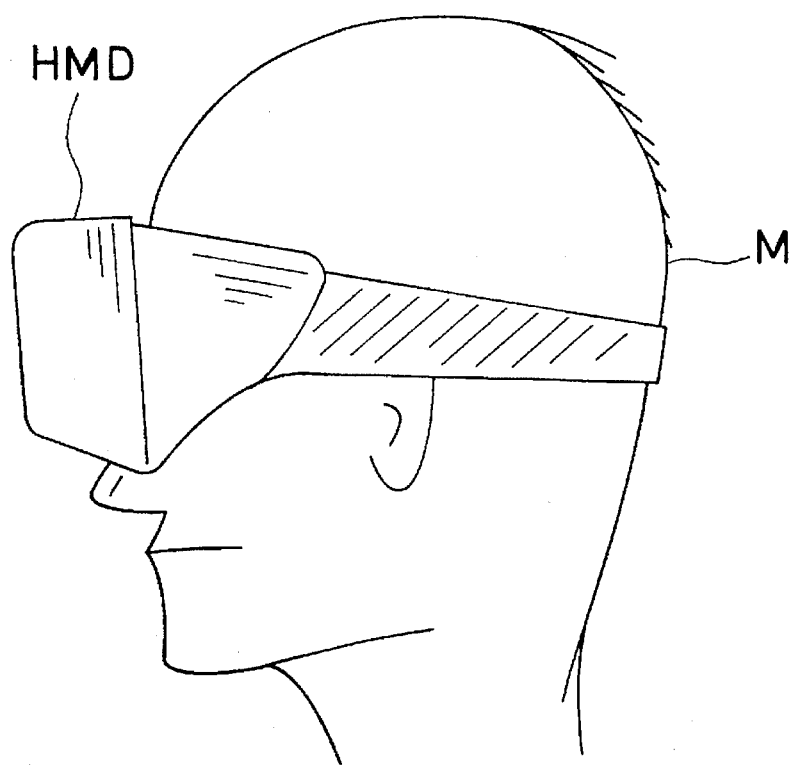
FIGS. 23(a) and 23(b) show an example in which the concentric optical system of the present invention is used as an ocular optical system of a head-mounted display system.
Figure 23B:
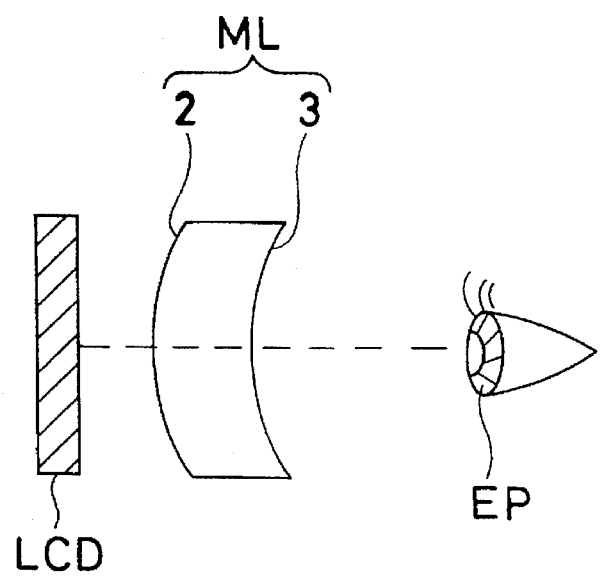
Figure 24:
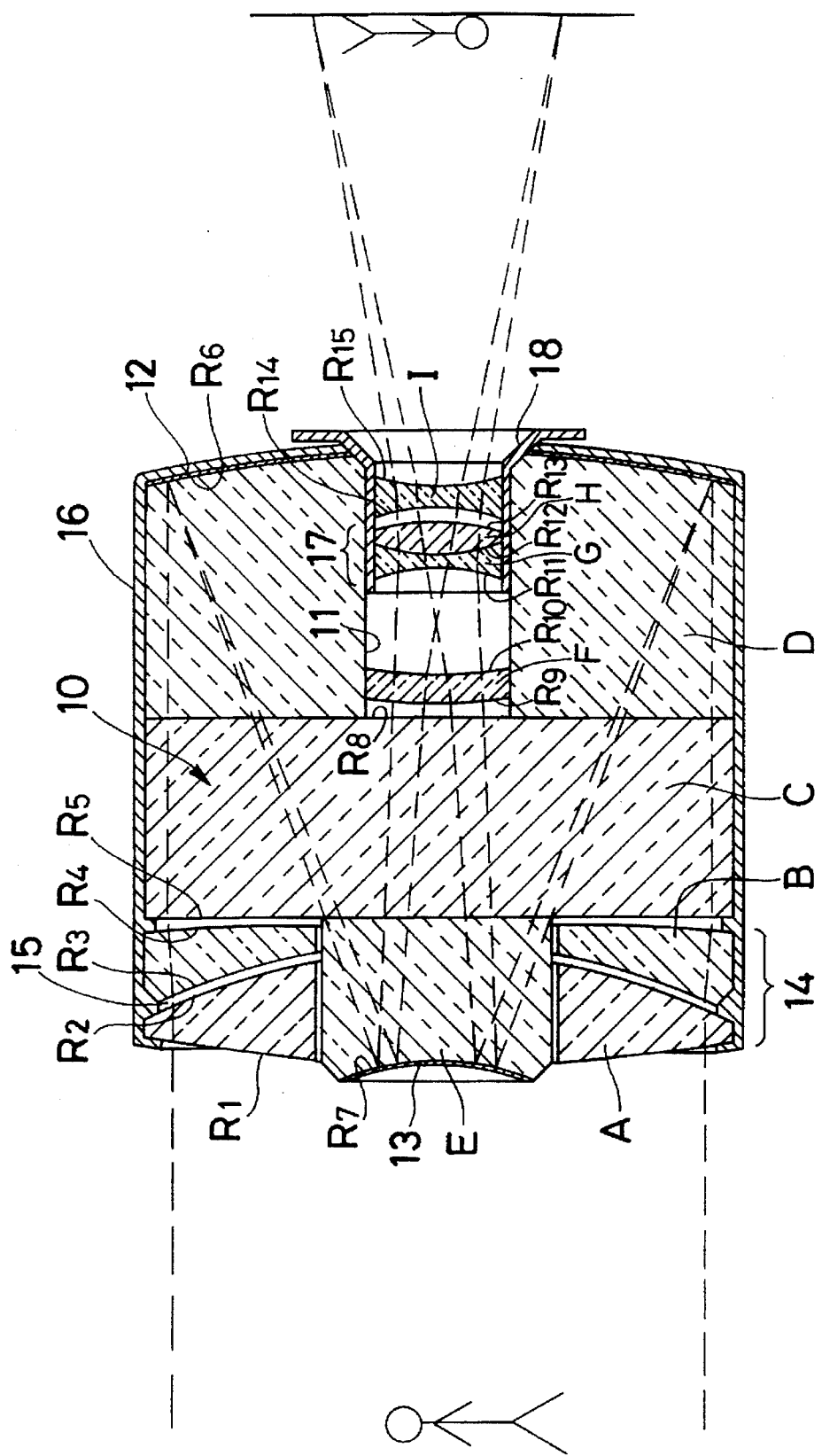
FIG. 24 is a sectional view of one example of a conventional reflecting telephoto objective.

As an ocular optical system, the concentric optical system of the present invention may be used, as shown for example in the perspective view of FIG. 23(a), for a head-mounted display system HMD designed so that a virtual image is projected in an eyeball of an observer M as a magnified image, thereby enabling the observer M to view a virtual aerial magnified image. In this case, as shown in the sectional view of FIG. 23(b), an ocular optical system is composed of a liquid crystal display device LCD for displaying an image, and a concentric optical system ML of the present invention, which is composed of first and second semitransparent reflecting surfaces 2 and 3. The concentric optical system ML is disposed such that the centers of curvature of the first and second semitransparent reflecting surfaces 2 and 3 lie in the vicinity of an eye point (pupil position) EP on the observer side, in order to project an image displayed on the liquid crystal display device LCD in the observer's eyeball as a magnified image.

As will be clear from the foregoing description, it is possible according to the present invention to obtain a concentric optical system usable as either an imaging optical system or an ocular optical system, which enables a clear image to be obtained at a field angle of up to about 90° and with a pupil diameter of up to about 10 millimeter with substantially no aberration. By using such a concentric optical system, it is possible to provide, for example, a head-mounted display system which enables observation of an image that is clear as far as the edges of the visual field at a wide presentation field angle.

What we claim is:

1. A concentric optical system comprising:
   at least two semitransparent reflecting surfaces each being convex toward an image side of said concentric optical system; and
   a turn-back optical path defined such that light passing through one of said at least two semitransparent reflecting surfaces is reflected at the other of said at least two semitransparent reflecting surfaces, then is reflected at said one of said at least two semitransparent reflecting surfaces, and finally is transmitted by said other of said at least two semitransparent reflecting surfaces;
   said turn-back optical path including:
      a first medium having a first dispersion, and
      a second medium having a second dispersion different from said first dispersion; and
   each of said at least two semitransparent reflecting surfaces having a transmittance in a range of from 20% to 80%.

2. A concentric optical system according to claim 1, further comprising:
   two optical components, said at least two semitransparent optical components being on said two optical components;
   said at least two semitransparent optical components lying adjacent to each other.

3. A concentric optical system according to claim 2, wherein:
   said at least two semitransparent reflecting surfaces and said turn-back optical path form an ocular optical system.

4. A concentric optical system according to claim 2, wherein:
   said at least two semitransparent reflecting surfaces and said turn-back optical path form an imaging optical system.

5. A concentric optical system according to claim 2, 4, or 1, further comprising:
   a first optical component and a second optical component, said at least two semitransparent optical components being on said first optical component and said second optical component;
   said concentric optical system satisfying the following condition:

$$0.2 < v_1/v_2 < 1.00 \tag{1}$$

where $v_1$ is a first Abbe's number of said first optical component, and $v_2$ is a second Abbe's number of said second optical component.

6. A concentric optical system according to claim 2, further comprising:
   a first optical component and a second optical component, said at least two semitransparent optical components being on said first optical component and said second optical component;
   said concentric optical system satisfying the following condition when a field angle in each of vertical and horizontal directions is 40° or more:

$$0.5 < v_1/v_2 < 0.98 \tag{2}$$

where $v_1$ is a first Abbe's number of said first optical component, and $v_2$ is a second Abbe's number of said second optical component.

7. A concentric optical system according to claim 2, further comprising:
   a first optical component and a second optical component, said at least two semitransparent optical components being on said first optical component and said second optical component;
   said concentric optical system satisfying the following condition when a field angle in each of vertical and horizontal directions is 40° or more, and a pupil diameter is 10 millimeters or more:

$$0.5 < v_1/v_2 < 0.95 \tag{3}$$

where $v_1$ is a first Abbe's number of said first optical component, and $v_2$ is a second Abbe's number of said second optical component.

8. A concentric optical system comprising:
   a first optical component including a first semitransparent reflecting surface on a pupil side of said concentric optical system, said first optical component containing a first medium having a first dispersion;
   a second optical component including a second semitransparent reflecting surface on a side of said concentric optical system opposite to said pupil side of said concentric optical system, said second optical component containing a second medium having a second dispersion different from said first dispersion; and means for cutting off light rays passing through said first transparent reflecting surface and said second transparent reflecting surface without being reflected by either of said first transparent reflecting surface and said second transparent reflecting surface, said cut-off means including:

a polarizing optical element;

both said first semitransparent reflecting surface and said second semitransparent reflecting surface being shaped such that a respective concave surface thereof is directed toward said pupil side of said concentric optical system; and said first optical component being located toward said pupil side of said concentric optical system with respect to said second optical component.

9. A concentric optical system comprising:

a first optical component including a first semitransparent reflecting surface on a pupil side of said concentric optical system, said first optical component containing a first medium having a first dispersion; and a second optical component including a second semitransparent reflecting surface on a side of said concentric optical system opposite to said pupil side of said concentric optical system, said second optical component containing a second medium having a second dispersion different from said first dispersion;

both said first semitransparent reflecting surface and said second semitransparent reflecting surface being shaped such that a respective concave surface thereof is directed toward said pupil side of said concentric optical system;

said first optical component being located toward said pupil side of said concentric optical system with respect to said second optical component; and each of said first transparent reflecting surface and said second transparent reflecting surface has a transmittance in a range of from 20% to 80%.

10. A concentric optical system according to claim 8 or 9, wherein:

said first semitransparent reflecting surface and said second semitransparent reflecting surface lie adjacent to each other.

11. A concentric optical system according to claim 8 or 9, wherein:

said first optical component, said second optical component, said first transparent reflecting surface, and said second transparent reflecting surface form an ocular optical system.

12. A concentric optical system according to claim 8 or 9, wherein:

said first optical component, said second optical component, said first transparent reflecting surface, and said second transparent reflecting surface form an imaging optical system.

13. A concentric optical system according to claim 8 or 9, wherein said concentric optical system satisfies the following condition:

$$0.2 < v_1/v_2 < 1.00 \qquad (1)$$

where $v_1$ is a first Abbe's number of said first optical component, and $v_2$ is a second Abbe's number of said second optical component.

14. A concentric optical system according to claim 8 or 9, wherein said concentric optical system satisfies the following condition when a field angle in each of vertical and horizontal directions is 40° or more:

$$0.5 < v_1/v_2 < 0.98 \qquad (2)$$

where $v_1$ is a first Abbe's number of said first optical component, and $v_2$ is a second Abbe's number of said second optical component.

15. A concentric optical system according to claim 8 or 9, wherein said concentric optical system satisfies the following condition when a field angle in each of vertical and horizontal directions is 40° or more, and a pupil diameter is 10 millimeters or more:

$$0.5 < v_1/v_2 < 0.95 \qquad (3)$$

where $v_1$ is a first Abbe's number of said first optical component, and $v_2$ is a second Abbe's number of said second optical component.

16. A concentric optical system comprising:

two optical components;

two semitransparent reflecting surfaces on said two optical components;

each of said two semitransparent reflecting surfaces having a concave surface directed toward a pupil plane of said concentric optical system;

said two semitransparent reflecting surfaces being disposed such that each of said two semitransparent reflecting surfaces transmits light rays at least once and reflects light rays at least once;

said two optical components each having a dispersion different from one another; and said two optical components being arranged such that a pupil that is formed by said two optical components lies outside a range of from a foremost surface to a rearmost surface of said concentric optical system; and means for cutting off light rays passing through said two semitransparent reflecting surfaces without being reflected by either of said two semitransparent reflecting surfaces, said cut-off means including:

a polarizing optical element.

17. A concentric optical system comprising:

a first optical component having a first semitransparent reflecting surface which has a center of curvature disposed substantially on an optical axis, and which has a concave surface directed toward said center of curvature, said first optical component being formed from a medium having a refractive index (n) larger than 1 (n>1);

a second optical component having a second semitransparent reflecting surface which has a center of curvature disposed at approximately the same position as the center of curvature of said first semitransparent reflecting surface, said second optical component being formed from a medium having a refractive index (n) larger than 1 (n>1); and means for cutting off light rays passing through said at least two semitransparent reflecting surfaces without being reflected by either of them, said cut-off means including a polarizing optical element;

said medium of said first optical component and said medium of said second optical component being different in dispersion from each other; and said first and second optical components being arranged so that a pupil that is formed by said first and second optical components lies outside a range of from a foremost surface to a rearmost surface of the optical system.

18. A concentric optical system comprising:

a first optical component having a first semitransparent reflecting surface;

a second optical component having a second semitransparent reflecting surface; and means for cutting off light rays passing through said at least two semitransparent reflecting surfaces without being reflected by either of them, said cut-off means including a polarizing optical element;

said first and second semitransparent reflecting surfaces having respective centers of curvature disposed at approximately the same position;

said first and second optical components being different in dispersion from each other;

said first and second semitransparent reflecting surfaces being arranged so that a bundle of light rays passing through said first semitransparent reflecting surface is reflected by said second semitransparent reflecting surface, and the bundle of light rays reflected by said second semitransparent reflecting surface is reflected by said first semitransparent reflecting surface and then passes through said second semitransparent reflecting surface; and said first and second optical components being arranged so that a pupil that is formed by said first and second optical components lies outside a range of from a foremost surface to a rearmost surface of the optical system.

* * * * *